(12) United States Patent
Ciocanel et al.

(10) Patent No.: US 10,147,558 B2
(45) Date of Patent: Dec. 4, 2018

(54) STRUCTURAL SUPERCAPACITOR

(71) Applicant: Arizona Board of Regents on Behalf of Northern Arizona University, Flagstaff, AZ (US)

(72) Inventors: Constantin Ciocanel, Flagstaff, AZ (US); Cindy Browder, Flagstaff, AZ (US); Bertrand Francis Cambou, Flagstaff, AZ (US)

( * ) Notice: Subject to any disclaimer, the term of this patent is extended or adjusted under 35 U.S.C. 154(b) by 0 days.

(21) Appl. No.: 15/472,119

(22) Filed: Mar. 28, 2017

(65) Prior Publication Data
US 2017/0200570 A1    Jul. 13, 2017

Related U.S. Application Data

(63) Continuation-in-part of application No. 14/391,975, filed as application No. PCT/US2013/037217 on Apr. 18, 2013.

(60) Provisional application No. 62/357,280, filed on Jun. 30, 2016, provisional application No. 61/635,128, filed on Apr. 18, 2012.

(51) Int. Cl.
| H01G 11/86 | (2013.01) |
| H01G 11/40 | (2013.01) |
| H01G 11/68 | (2013.01) |
| H01G 11/56 | (2013.01) |
| H01G 11/36 | (2013.01) |
| H01G 11/26 | (2013.01) |
| H01G 11/84 | (2013.01) |

(52) U.S. Cl.
CPC .............. *H01G 11/86* (2013.01); *H01G 11/26* (2013.01); *H01G 11/36* (2013.01); *H01G 11/40* (2013.01); *H01G 11/56* (2013.01); *H01G 11/68* (2013.01); *H01G 11/84* (2013.01)

(58) Field of Classification Search
CPC ........ H01G 9/025; H01G 9/028; H01G 9/045; H01G 9/125; H01G 9/145; H01G 11/34; H01G 11/36; H01G 11/52; H01G 11/68; H01G 11/86
See application file for complete search history.

(56) References Cited

U.S. PATENT DOCUMENTS

| 6,031,711 | A  | * | 2/2000  | Tennent   | B82Y 30/00 361/301.5 |
| 7,623,340 | B1 | * | 11/2009 | Song      | B82Y 30/00 361/502 |
| 9,831,045 | B2 | * | 11/2017 | Hucker    | H01G 11/52 |
| 2003/0152837 | A1 | * | 8/2003 | Noh       | H01M 6/181 429/317 |
| 2006/0166810 | A1 | * | 7/2006 | Gunderman | B01D 61/20 502/64 |
| 2006/0204854 | A1 | * | 9/2006 | Fujimoto  | C08J 5/20 429/303 |
| 2008/0297983 | A1 | * | 12/2008 | Kawabata | H01G 9/045 361/529 |
| 2010/0002362 | A1 | * | 1/2010 | Clelland  | H01G 11/12 361/502 |

(Continued)

*Primary Examiner* — Nguyen T Ha

(57) ABSTRACT

A composition of a capacitor and a method to form same are disclosed. The capacitor comprises a first electrode, a second electrode, and at least one cellular material disposed between said first electrode and said second electrode. Further, the capacitor is at least partially impregnated with one or more liquid prepolymers comprising an electrolyte material, which is cured to form a polymeric matrix.

13 Claims, 16 Drawing Sheets

(56) References Cited

U.S. PATENT DOCUMENTS

| | | | | |
|---|---|---|---|---|
| 2012/0177934 A1* | 7/2012 | Vogel | ............ | H01L 41/29 428/457 |
| 2012/0214000 A1* | 8/2012 | Kyrlidis | ............ | H01G 11/24 428/402 |
| 2016/0043384 A1* | 2/2016 | Zhamu | ............ | H01M 4/133 429/231.4 |

* cited by examiner

STRUCTURAL SUPERCAPACITOR

CROSS-REFERENCE TO RELATED APPLICATIONS

The application claims the benefit of and priority to U.S. Provisional Patent Application Ser. No. 62/357,280, filed on Jun. 30, 2016, and is a Continuation-In-Part of U.S. patent application Ser. No. 14/391,975, filed on Oct. 10, 2014, which is a U.S. national stage of International Application No. PCT/US2013/037217, filed on Apr. 18, 2013, which claims the benefit of, and priority to U.S. Provisional Patent Application Ser. No. 61/635,128, filed on Apr. 18, 2012. Each application is incorporated herein by reference.

BACKGROUND OF THE INVENTION

Field of the Invention

The present disclosure relates to the construction of capacitors, such as structural capacitors, that include one or more layers of cellular materials between the electrodes of the capacitors and methods of manufacturing the same.

Description of Related Art

The concept of structural capacitors was first introduced and conceptually proven in 2001 when a dielectric capacitor to be embedded in the casing of an electronic device was developed. This was done to minimize the volume of the device as capacitors are usually bulky and take up a large amount of space on a circuit board. This capacitor was made with electrodes of continuous carbon fiber and different types of paper as dielectric, all bonded together with an epoxy matrix, with capacitance per unit area having a maximum value of 1.23 $\mu F/m^2$ measured at 2 MHz, for a capacitor using a 0.04 mm thick writing paper as dielectric. Research efforts have continued since, with researchers reporting further developments on the structural capacitors with different types and numbers of layers of dielectric materials used. These structural capacitors exhibited mass and/or volume savings, but did not perform the individual functions as well as conventional capacitors or composite materials.

BRIEF SUMMARY OF THE INVENTION

The association of carbon fiber electrodes, and carbon based solid polymer electrolytes, with their light weight, and stable thermal properties, can facilitate the manufacturing of supercapacitors with enhanced structural strength. In order to further augment the mechanical strength of these structures the present disclosure provides that multiple layers of honeycomb shaped material can be sandwiched between the electrodes. In addition to significantly strengthening the overall structure, the multiple layers of honeycomb shaped material can improve the process control of the manufacturing of the structural supercapacitor, by keeping the space between electrodes constant. This allows for the stacking of supercapacitor elements to further increase their structural strength while simultaneously magnifying the value of the capacitance and augmenting the system's electric power storage capability. The outcome consists of sturdy structural supercapacitors that can be part of mechanical structures of end systems which require lightweight high power storage capabilities. The present novel structure thereby can replace, in whole or in part, batteries by storing power within mechanical structures such as walls, floors, ceiling, frames, and the connecting beams of the full devices/systems.

Embodiments of the current disclosure describe a method of forming a capacitor. The method includes providing a first carbon-based electrode and a second carbon-based electrode; and disposing at least one cellular material between the first carbon-based electrode and the second carbon-based electrode. Further, the method includes impregnating at least one of the first and the second carbon-based electrode and the cellular material at least partially with one or more liquid prepolymers comprising an electrolyte material. In addition, the method includes curing said one or more liquid prepolymers to form a polymeric matrix, thereby forming said capacitor comprising a three-layer laminate capacitor. Further, embodiments of the current disclosure describe a method to form a capacitor comprising a five-layer laminate by inserting a separator layer between cellular material layers.

Moreover, embodiments of the current disclosure describe methods to form different composite capacitors. For example, one composite capacitor contains (N) two-layer laminate comprising a carbon-based electrode and a cellular material stacked on top of a three-layer laminate capacitor. Another composite capacitor includes (M) four-layer laminate comprising a carbon-based electrode, a first cellular material, a separator layer, and a second cellular material stacked on top of a five-layer laminate capacitor. Another composite capacitor contains (N) two-layer laminate comprising a carbon-based electrode and a cellular material stacked on top of a three-layer laminate capacitor to form a [3+2×(N)]-layer laminate and (M) four-layer laminate comprising an electrode, a first cellular material, a separator layer, and a second cellular material stacked on top of said [3+2×(N)]-layer laminate. Another composite capacitor contains (M) four-layer laminate comprising a carbon-based electrode, a first cellular material, a separator layer, and a second cellular material stacked on top of a five-layer laminate capacitor and (N) two-layer laminate comprising a carbon-based electrode and a cellular material stacked on top of said [5+4×(M)]-layer laminate.

Specific embodiments of the present invention will become evident from the following detailed description of certain embodiments, examples, and the claims.

DETAILED DESCRIPTION OF THE INVENTION

Figure 1A:
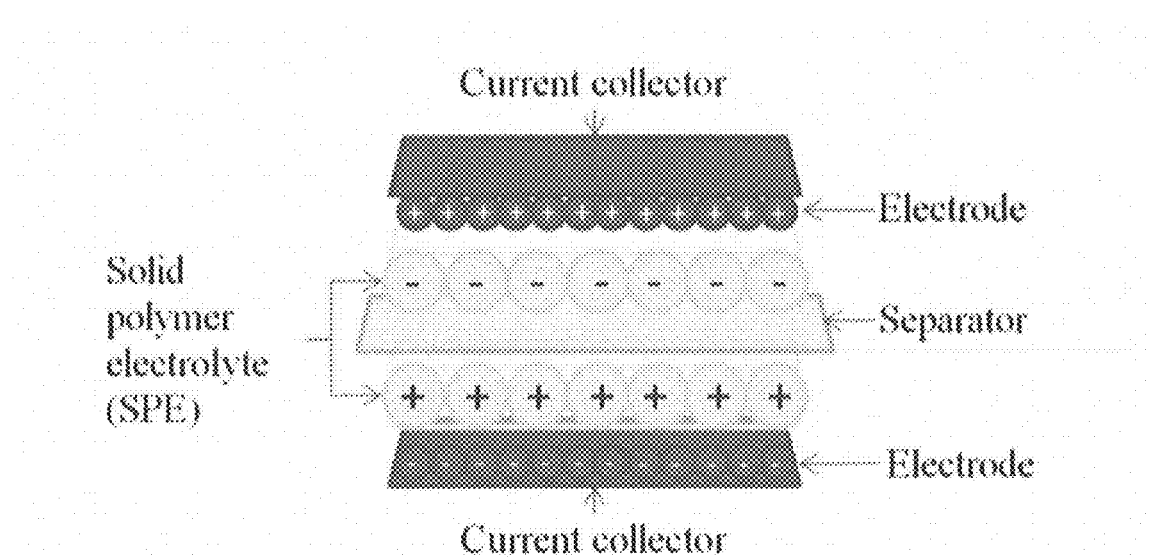
FIG. 1A shows a schematic of an electric double layer capacitor (EDLC) and its components.

The commercial importance of efficient power storage technologies is rising with the acceptance of a wide range of applications such as electric vehicles, unmanned aerial vehicles, portable electronics, airplanes, games, and renewable energy. Storing a high amount of power in small contained volumes (e.g., batteries) is a potential safety threat due to the risk of fire, and the burden of added weight to subsystems. Furthermore, system usability may be reduced due to lengthy recharging cycles (of batteries, in particular). This can all result in marginal solutions for a system with limited range of operation, heavy structures, and potential hazards. The novel structure proposed here optimizes three parameters of power storage elements: stored specific energy (per unit volume & weight), total weight, and time to recharge.

In most systems, the need to access electric power is highly variable over time. For example, an electric vehicle may need significant torque/energy to accelerate, then much less torque/energy to cruise. During peak demand the power storage system is subject to high current discharge and temperature increases, which can damage the system. The power storage systems need to be oversized for this reason, which can increase weight, degrading the trade-off between weight and stored energy. The present supercapacitor structure may mitigate these problems.

In such an approach, a supercapacitor provides energy during peak demand, while protecting the battery during normal use. In this case, the supercapacitors can have another fundamental attribute—their ability to handle rapid and highly consistent charging cycles. So, for example, the supercapacitor can be charged during the deceleration of an electric vehicle, and partially discharged during acceleration, while the system's conventional battery can provide power during cruising/normal operation conditions. However the storage capacity of previously disclosed supercapacitors in terms of power per kilogram is not as good as lithium ion batteries, thereby limiting their deployment. As used herein, a supercapacitor is a device arranged to store electrical energy or charge. A supercapacitor may be a high-capacity electrochemical capacitor with relatively high capacitance values as compared to conventional capacitors. Alternatively, and as used herein, however, the term supercapacitor may be used to refer to capacitors in general, without regard to the supercapacitor having a specific or relative capacity to store charge.

Structural supercapacitors, built with carbon fiber electrodes and carbon based solid polymer electrolytes, are mechanically strong, light, and thermally stable, have few operational hazards, and are friendly to the environment. They can be integrated directly into the mechanical structure of a system/subsystem, replacing metal or plastic panels or other similar components. As a result, the structural supercapacitor has the potential to store/deliver energy and to reduce load on the battery during peak demand without significantly adding weight to the system/subsystem. The novel integration presented in this disclosure has the objective of largely enhancing the mechanical strength of the structure and to increase the power density stored in the structural supercapacitors with the integration of multi-layered honeycomb shaped materials.

The present structural supercapacitor design utilizes the integration of rugged carbon fiber elements with a solid polymer electrolyte and the honeycomb shaped material to provide efficient operation and structural rigidity and strength. This combination of materials leverages the superior mechanical properties of carbon fibers; a material that is used for its ruggedness to replace metal in racing cars, racing bikes, planes and many other applications. Furthermore, the present design uses stiff honeycomb shaped materials that are integrated with solid polymer electrolytes, and rugged carbon fiber electrodes. The combination of stiff, solid, and rugged elements makes the resulting structural supercapacitor sufficiently strong and resilient to replace the mechanical infrastructure of final systems.

Additionally, being constructed of carbon fiber components, the present supercapacitor design can be manufactured in non-planar shapes. For example, the carbon fiber electrodes could be formed in various curvilinear configurations. In such an embodiment, it may only be necessary that both carbon fiber electrodes be formed with the same shape (i.e., the same curvature) and be positioned in parallel to one another within the supercapacitor structure. To facilitate the formation of this arrangement, a honeycomb structure, separator, and solid polymer electrolyte could then be formed as desired between the two non-planar carbon fiber electrodes to form the structural supercapacitor device.

In some cases, structural and ion transport properties extracted from computational work will elucidate appropriate polymer composition for the solid polymer electrolyte (SPE) matrix to yield optimal power storage characteristics. These requirements may be similar to those found in the petroleum-derived polyethylene oxide (PEO) matrix of current SPEs, which is mimicked in the structures of non-toxic polymers such as corn-derived polylactic acid) (PLA) (used to make food packaging and baby toys). Combining a safe and sustainable SPE matrix with earth-friendly metal ions like sodium, potassium, or magnesium may improve the long-term economic and environmental viability of the material.

Figure 16A:
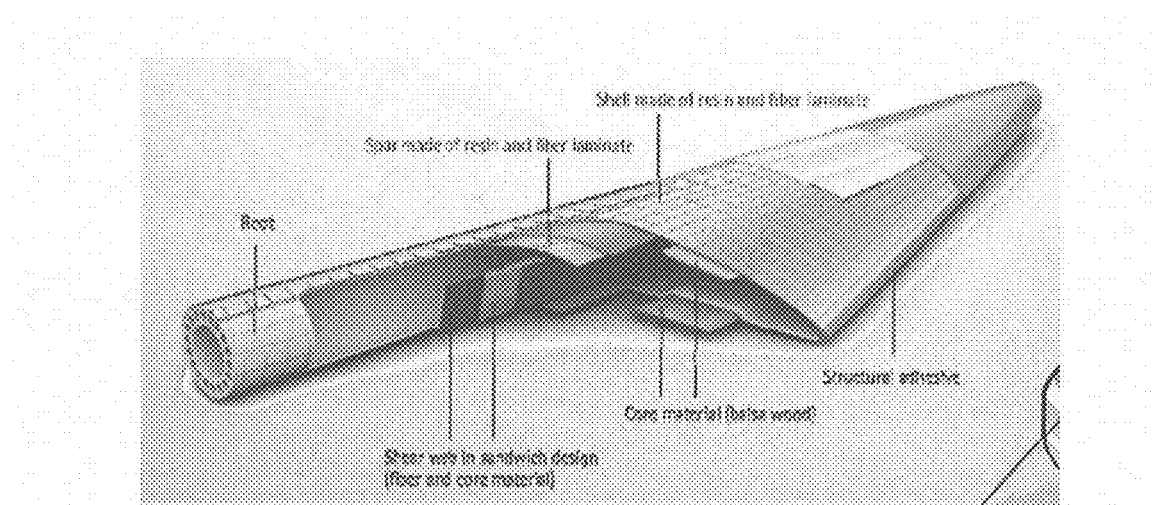
FIGS. 16A and 16B depict examples of environments in which non-planar supercapacitors are installed into existing systems.
Figure 16B:
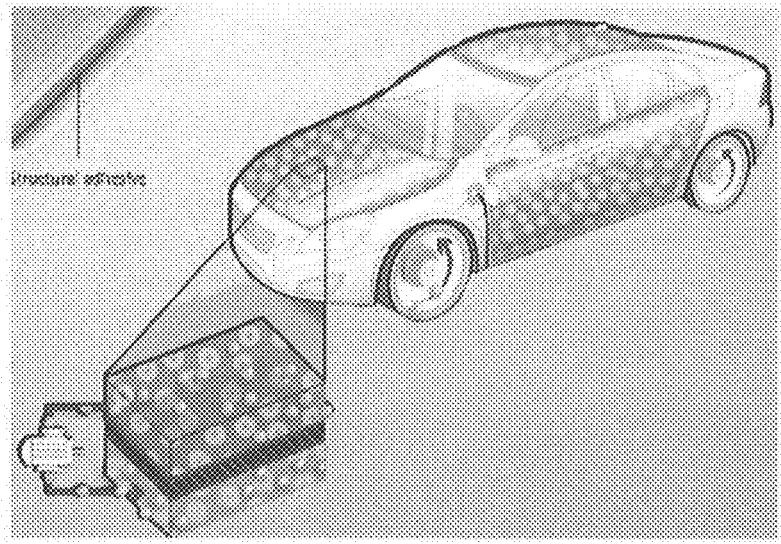

To illustrate these uses of the present supercapacitor design, FIGS. 16A and 16B depict example of environments in which non-planar, but structural supercapacitors could be installed into existing system. In FIG. 16A, the supercapacitor structure has been at least partially integrated into a wing suitable for an aircraft. Because the present supercapacitor has structural rigidity, the supercapacitor can be utilized not only to form the skin or surface of the wing structure, but may also form part or all of various structural elements of the wing system. Because the supercapacitor can be formed in non-planar shapes, the supercapacitor incorporated into the wing structure can be tailored to form the desired curvature and shape of the wing structure.

Similarly, in FIG. 16B, a number of supercapacitors can form the door panels or other body panels of a vehicle, such as the depicted automobile. Because of the strength of the present supercapacitor design, the panels are structural and can operate as safety barriers in the event of a collision. Additionally, because the supercapacitors include a stable solid polymer electrolyte, in the event of a collision, and potential penetration of one or more of the supercapacitor's carbon fiber electrodes, the risk of fire may be eliminated.

The present disclosure provides a salt-in-polymer Li/PEO solid polymer electrolyte (SPE) with $10^{-4}$ S/cm conductivity at room temperature, which integrates well with the separator and carbon fiber electrodes of a structural composite super capacitor. The tensile and bending strengths of the resulting composite may be about 30% and 80% less than those of an epoxy based composite, respectively. Additionally, the present SPE may be more earth-friendly than conventional materials as it does not rely on mined lithium or petroleum based polymers for its formulation. The conductivity of PEO-based electrolytes may be attributed to the reversible complexation and diffusion of cations within the PEO matrix.

In seeking an alternative polymer matrix for an SPE, polylactide (PLA) has been identified as having a PEO-like backbone, which may allow for similar ion complexation and transport in an electrolyte system. PEO coordinates lithium ions between neighboring oxygen atoms within a chain, or across oxygens in nearby chains with 4,4'-Diaminodicyclohexyl methane as a cross-linker in structure 1 as below:

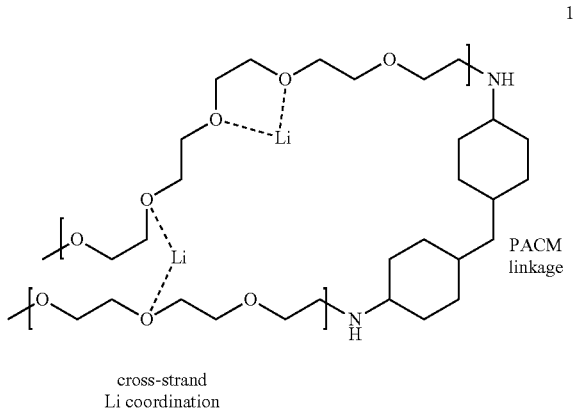

PLA, in contrast, has two modes by which lithium can be coordinated within a chain, and increase the number of sites for coordination across chains with 4,4'-Diaminodicyclohexyl methane as a cross-linker in structure 2 as below:

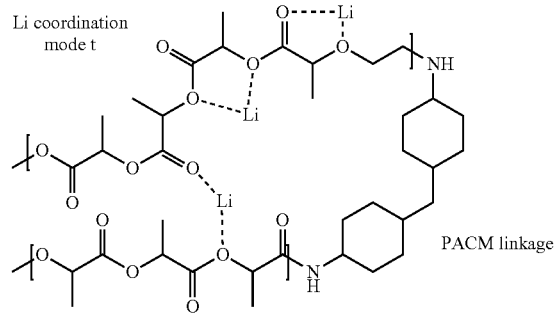

The increased level of oxygenation in PLA relative to PEO could allow for increased motility of lithium ions, and therefore conductivity. In addition, the increased crystallinity of PLA relative to PEO may prove advantageous in ion transport. PLA is both biologically-derived and biodegradable, making the polymer renewable and sustainable. As shown in scheme 1 as below,

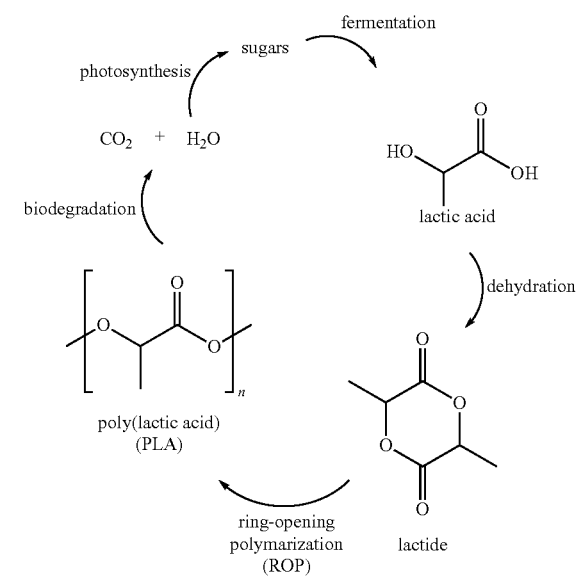

PLA may be prepared from lactide, which in turn is derived from fermentation of sugars derived from plant mass (typically corn). Many forms of PLA are readily compostable, rendering long-term waste disposal irrelevant.

The present disclosure provides a PLA-based SPE that may be highly conductive ($10^{-4}$ Si/cm at room temperature), electrochemically stable, adheres well to the electrodes and separator, provides mechanical strength to the composite material (in tension, bending and compression), and prepared using sustainable and renewable resources. Preparation of the renewable SPE may involve a combination of computation, synthesis, and analysis as follows:

Examination of ion transport, and optimization of PEO- and PLA-based electrolytes.

A PEO-based SPE may be composed from a PEG precursor with an average $M_n$ of 500, which is further polymerized with a bis-(p-aminocyclohexyl)methane (PACM) linker, blended with propylene carbonate (PC) and silane plasticizers, and doped with lithium salts. The roles of each of these components in ion transport may be elucidated computationally, and the formulation of the PEO-based SPE can be refined accordingly.

As an example of PLA-based electrolyte formulation, a PLA-based SPE analogous to a current PEO-based SPE is described. SPE formulation may commence by preparing PLA from lactide to obtain PLA with a $M_n$ of 500 or MW of 22,000 as shown in scheme 2 below:

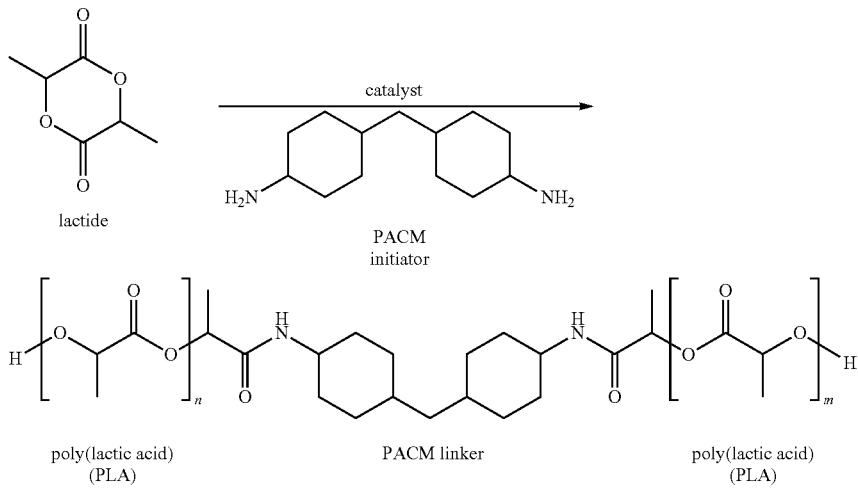

The chain length of PLA can be tuned by altering the catalyst, reaction time, and reaction temperature. PACM will be employed as the initiator in the ring-opening polymerization (ROP) process, but because PLA has higher Tg when compared to PEO of similar MW, a successful PLA-based SPE may require an initiator that is different than that used in PEO-based SPE. For example, a simple linker such as ethylene glycol, or a monosaccharide diol derived from natural sources, may be used in place of PACM.

In another example of PLA-based electrolyte formulation, scheme 3 below illustrates the preparation of PLA allyl ether (PLAAE) from the monomer precursor lactide:

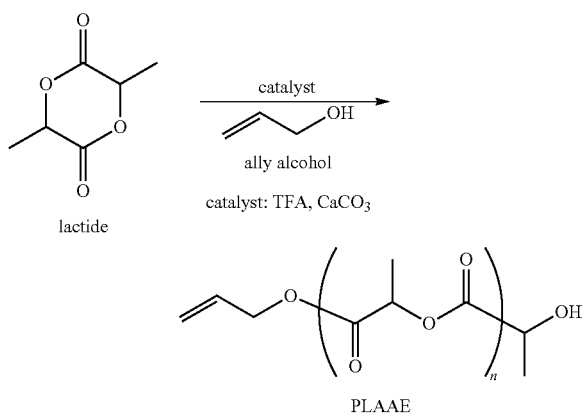

In this example, the reaction conditions are modified to obtain a variety of polymers with n ranging from 100 to 500. To accomplish this, Applicants vary the ratio of allyl alcohol to lactide, and explore the use of "green" catalysts such as CaCO₃. Larger amounts of allyl alcohol will result in shorter chains of PLAAE, and smaller amounts of allyl alcohol will provide longer PLAAE chains. The average number of PLA repeats obtained will be determined by $^1$H NMR spectroscopy, where the number of hydrogens in the repeating unit of PLAAE can be compared to the number of hydrogens in the allyl or hydroxyl terminus of the polymer. Full characterization of PLAAE will include IR spectroscopy to identify the major functional groups on the polymer; $^1$H and $^{13}$C NMR spectroscopy elucidate the complete structure and purity; and mass spectroscopy to deduce the molecular weight and molecular formula of the product. The latter technique will also confirm the $M_n$ value for each polymer constructed.

With PLAAE in hand, two synthetic steps are required to convert it to the diglycidyl ether, as illustrated in Scheme 4:

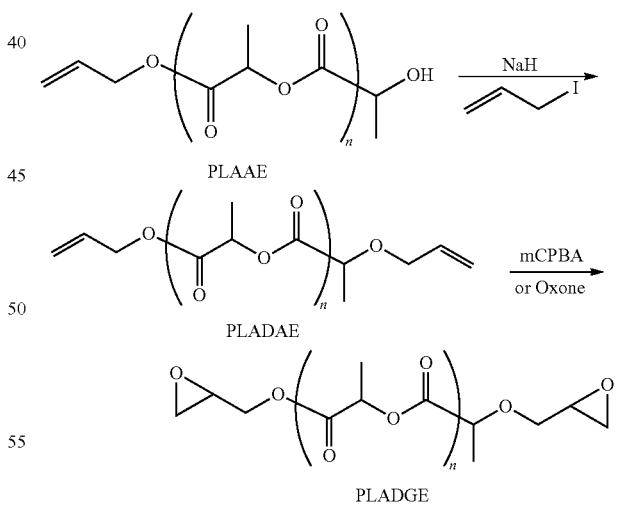

First, PLAAE will be treated with sodium hydride followed by allyl iodide to install a second allyl group on the hydroxyl terminus of the PLA moiety. Alkalai and alkaline earth metals are used to carry out the allylation of non-polymeric lactate esters. Finally, the terminal double bonds of PLA-DAE will be subjected to epoxidation with mCPBA. Alternately, Oxone can be employed to provide even more mild and specific oxidation conditions for PLADAE. Both PLA- DAE and PLADGE will be fully characterized by IR, $^1$H NMR, $^{13}$C NMR, and mass spectrometry (as described for PLAAE) to determine the structure, formula, and purity of the polymers. PLADGE units with lower n values are synthesized here. In certain embodiments, the n equals to 100. In other embodiments, the n is less than 100.

Scheme 5 illustrates employing PLADGE units in SPE formulation:

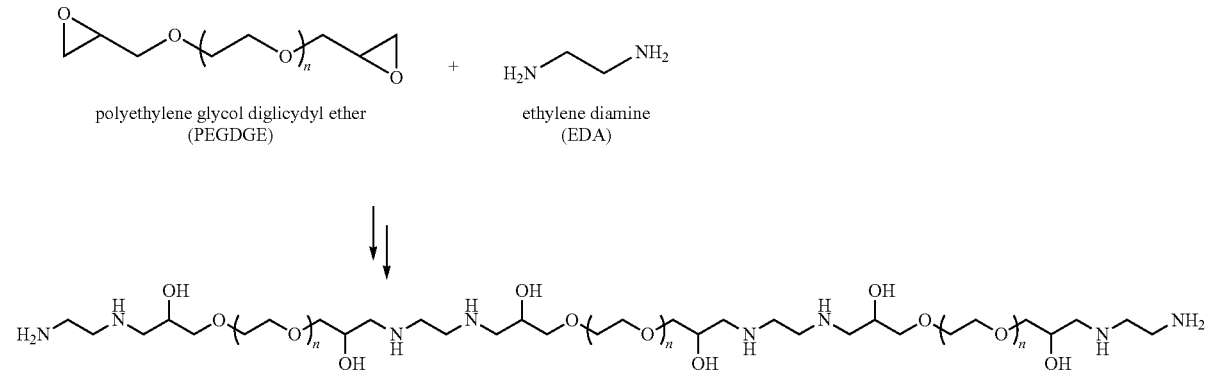

polyethylene glycol diglicydyl ether (PEGDGE)  +  ethylene diamine (EDA)

An electrolytic salt (LiCl) is dissolved in the minimal amount of solvent (H2O) needed, and cooled to 0° C. in a sonicator bath. The PLADGE is combined with the lithium chloride solution, mixed gently, and sonicated in a 0° C. bath to remove all air bubbles. The curing agent (ethylene diamine) is then added to the cold PLADGE-salt solution, mixed gently, and sonicated in a 0° C. bath until the onset of curing (an increase in viscosity is observed). The prepolymer mixture is then poured into an appropriate mold and allowed to cure at room temperature for 24 h. In other embodiments, triethylenediaminetetraamine (TETA) can be used as a curing agent. In yet other embodiments, 4,4-dimethylenebis(cyclohexylamine) (PALM) can be used as a curing agent. The hardening of the prepolymer is attributed to the extension of the PLA polymer chain by reaction with the curing agent. In the curing process, the nucleophilic ends of the diamine curing agent readily react with the diglycidyl ethers of PLADGE. As shown in scheme 5, EDA is added to the diglycidyl ether ends of PLADGE, to build a longer polymer chain. The resulting SPE are characterized differently than the PLADGE building blocks. Because the SPE is insoluble in the solvents required for NMR, only IR spectroscopy is carried out on the neat solid. In addition, Applicants conduct thermal analysis via differential scanning calorimetry and thermogravimetric analysis, in order to determine the melt, glass transition, and decomposition temperatures of the SPE.

Determination of Renewable Conductive Ions.

Of the conductive ions used in SPE systems, lithium salts are most commonly employed and most thoroughly studied Li salts are soluble in highly oxygenated PEO "solvents" and are able to migrate through a PEO SPE system via reversible coordination with oxygens.

In order to address the issue of sustainability, salts extracted from renewable sources, rather than mined, may replace lithium in the present SPE system.

Cation: Magnesium ions are similar in size to lithium ions, and interact with oxygen with similar geometry and complex strength as lithium. Magnesium salts have provided comparable conductivities to lithium salts in PEO SPEs, at lower concentrations of Mg2+ relative to Li+. However, magnesium is a divalent ion (Mg2+), which may be subject to different transport properties than monovalent Li+. For example, SPEs were found to contain both Mg2+ and MgX+ (X=Cl, ClO4) cations in multiple cases; the latter may coordinate differently than Li+ or Mg2+ within the PEO matrix. Further exploration of Mg2+ behavior in our SPE may involve experimental and computational approaches for the examination of both monovalent (1:2 Mg:anion ratio) and divalent (1:1 Mg:anion ratio) anions, to facilitate implementation of Mg+ in a sustainable SPE system. In addition, sodium and potassium (both monovalent) ions can be explored. Their larger size may result in different transport phenomena, for which computational predictions will be correlated with experimental data. Use of divalent anions with monovalent cations (2:1 cation:anion ratio) may also be explored.

Anion: A current Li/PEO SPE uses LiN(S02CF3)2 (LiTFSI), a commonly-employed electrolytic salt because of its solubility, poor ion pairing, and poor mobility of the TFSI anion in PEO. However, LiTFSI has been observed to be electrochemically unstable in other SPE systems; further, less-conductive LiS02CF3 (LiTf) SPEs have been found to provide better capacitance in an EDLC. Other lithium salts, such as LiCl and LiBr, can perform well in conductivity testing; in fact, LiCl provides improved conductivity relative to LiBr or LiTFSI in our PEO-based SPE. Additionally, earth-friendly phosphate, sulfate ions, and other polarizable anions, which are large and "soft," could facilitate the use of divalent cations or allow for use of a greater ratio of monovalent cations to anions. Computation and experimentation will explore the cation:anion ratio to optimize the electrolyte salt.

Initiator and block copolymer units. Important to the performance of our Li/PEO SPE are the curing agent and polymer blend agent. The curing agent is responsible for the formation of extended polymer systems, specifically linking PEO chains together. PACM may provide for the best electrical and mechanical properties in the SPE, when compared to other diamines. Through computational studies, the details of the role of PACM within the polymer can be elucidated. Whether PACM acts to disrupt the crystalline structure typically adopted by PEO, or regular spacing of PACM units provides for ordered PEO regions, can be examined computationally. However, PACM is not derived from a renewable resource, so a replacement (such as monosaccharide diols) may be used in formulating a sustainable SPE. Furthermore, given PLA's higher Tg than PEO, different linkers/initiators in the PLA system may be required to obtain acceptable properties for electrolyte function.

An alternate method that may provide for the desired structural and electrochemical properties while using renewable building blocks is ROP of bioderived lactone initiators. An example of a PLA-co(polyvalerolactone) (PLA-co-PVL) structure is shown in scheme 6 as below:

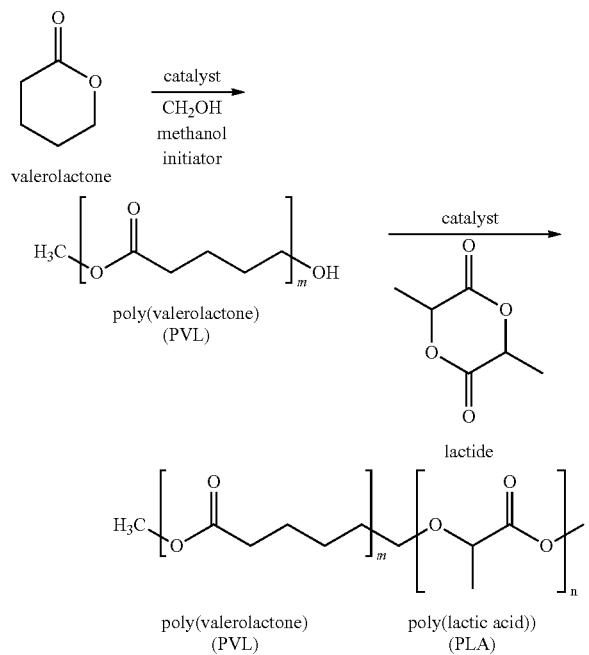

which could be prepared from a two-step block copolymerization process. The lactone is first opened using a simple alcohol precursor to provide a poly(lactone) (PL) structure, which is then used as the initiator in the ROP of lactide. The choice of catalyst, reaction temperature, and reaction time will allow the PL and PLA regions to be tuned to provide optimal block lengths.

Elastic polymers could provide good tensile strength in the present composite system, Methylvalerolactone has also been used in ROP processes with PLA, providing completely renewable and biodegradable polymer products.

Plasticizer or blend agent, Polymer blends provide a simple way to combine properties of different polymers. In the present Li/PEO SPE, a silane fluid can be added to improve the amorphous character of the polymer, and ostensibly the ion flow and conductivity. Because PLA is very rigid, a plasticizer such as a silane may be necessary to achieve desired conductivity. Renewable plasticizers, such as vegetable oils, stable triglycerides (e.g. castor oil), or fluid oil derivatives (e.g. biodiesel), ethylene glycol, diethylene glycol, lactide, and glycolide, are desirable given a goal of developing an environmentally-friendly SPE. The lower levels of oxygenation of these renewable materials should not interfere with conductivity. Should miscibility of these nonpolar oils with the polar SPE matrix be problematic, fillers such as silica and alumina nanoparticles can be used for emulsification.

Figure 1B:
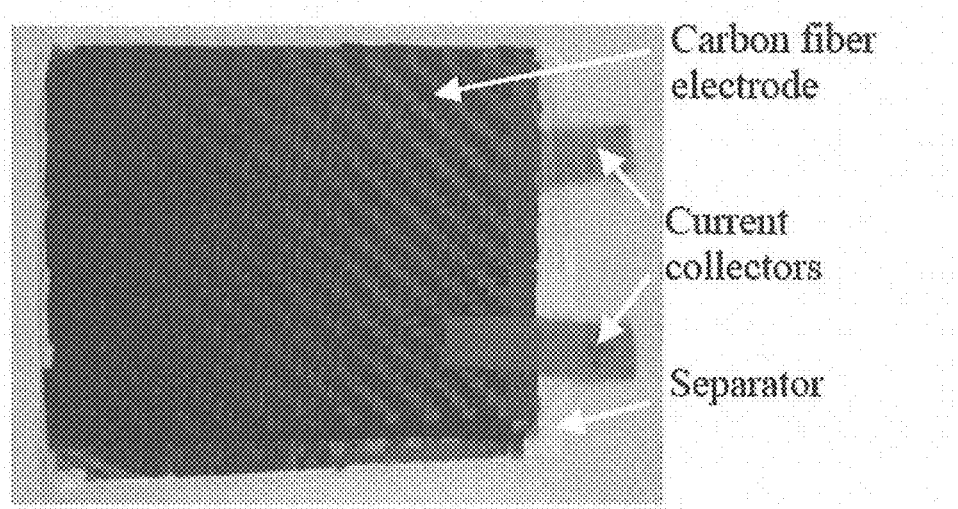
FIG. 1B shows a structural EDLC sample.

A typical electric double layer capacitor (EDLC), together with a sample structural supercapacitor is shown in FIG. 1. The separator blocks electrical flow, but allows ions to pass through. The electrolyte is a mix between an ion rich salt and a polymer blend. In regular EDLCs, the electrolyte is a liquid or gel, while in the proposed structural EDLC the electrolyte is solid. When a voltage is applied across electrodes, the positive ions will gravitate toward the negative electrode and the negative ions will move toward the positive electrode, storing charge at the two electrolyte-electrode interfaces (hence the electric double layer capacitor label).

In one embodiment, the disclosure provides the solid polymer electrolyte wherein the bis-epoxide is selected from the group consisting of poly(ethylene glycol) bisglycidyl ether, polylactic acid) diglycidyl ether, resorcinol diglycidyl ether, polydimethyl siloxane bisglycidyl ether, and mixtures thereof.

In another embodiment, the solid polymer electrolyte of the disclosure is wherein the bis-epoxide is poly(ethylene glycol) bisglycidyl ether and one or more bis-epoxides selected from the group consisting of resorcinol diglycidyl ether, polydimethyl siloxane bisglycidyl ether, and mixtures thereof.

In particular embodiments, the solid polymer electrolyte of the disclosure as described above is wherein the bis-epoxide is poly(ethylene glycol) bisglycidyl ether and resorcinol diglycidyl ether. In other particular embodiments, the epoxy is prepared from a composition comprising poly(ethylene glycol) bisglycidyl ether and resorcinol diglycidyl ether in a molar ratio of about 1:1 to about 1000:1, or about 1:1 to about 500:1; or about 1:1 to about 200:1; or about 1:1 to about 100:1; or about 1:1 to about 50:1; or about 1:1 to about 20:1; or about 1:1 to about 1:10; or about 1:1 to about 1:5; or about 1:1 to about 1:4; or about 1:1 to about 1:3; or about 1:1 to about 1:2; or 10:1 to about 1000:1, or about 10:1 to about 500:1; or about 10:1 to about 200:1; or about 10:1 to about 100:1; or about 10:1 to about 50:1; or about 10:1 to about 20:1; or 20:1 to about 1000:1, or about 20:1 to about 500:1; or about 20:1 to about 200:1; or about 20:1 to about 100:1; or about 20:1 to about 50:1; or 50:1 to about 1000:1, or about 50:1 to about 500:1; or about 50:1 to about 200:1; or about 50:1 to about 100:1 based on the concentration of epoxide groups in the composition.

In other embodiments, the solid polymer electrolyte of the disclosure as described above is wherein the bis-epoxide is poly(ethylene glycol) bisglycidyl ether and polydimethyl siloxane bisglycidyl ether. In particular embodiments, the epoxy is prepared from a composition comprising poly(ethylene glycol) bisglycidyl ether and polydimethyl siloxane bisglycidyl ether in a molar ratio of about 1:1 to about 1000:1, or about 1:1 to about 500:1; or about 1:1 to about 200:1; or about 1:1 to about 100:1; or about 1:1 to about 50:1; or about 1:1 to about 20:1; or about 1:1 to about 1:10; or about 1:1 to about 1:5; or about 1:1 to about 1:4; or about 1:1 to about 1:3; or about 1:1 to about 1:2; or 10:1 to about 1000:1, or about 10:1 to about 500:1; or about 10:1 to about 200:1; or about 10:1 to about 100:1; or about 10:1 to about 50:1; or about 10:1 to about 20:1; or 20:1 to about 1000:1, or about 20:1 to about 500:1; or about 20:1 to about 200:1; or about 20:1 to about 100:1; or about 20:1 to about 50:1; or 50:1 to about 1000:1, or about 50:1 to about 500:1; or about 50:1 to about 200:1; or about 50:1 to about 100:1 based on the concentration of epoxide groups in the composition.

In particular embodiments, the solid polymer electrolyte of the disclosure as described above is wherein the bis-epoxide is poly(ethylene glycol) bisglycidyl ether and bisphenol A diglycidyl ether. In certain embodiments, the epoxy is prepared from a composition comprising poly(ethylene glycol) bisglycidyl ether and bisphenol A diglycidyl ether in a molar ratio of about 1:1 to about 1000:1, or about 1:1 to about 500:1; or about 1:1 to about 200:1; or about 1:1 to about 100:1; or about 1:1 to about 50:1; or about 1:1 to about 20:1; or about 1:1 to about 1:10; or about 1:1 to about 1:5; or about 1:1 to about 1:4; or about 1:1 to about 1:3; or about 1:1 to about 1:2; or 10:1 to about 1000:1, or about 10:1 to about 500:1; or about 10:1 to about 200:1; or about 10:1 to about 100:1; or about 10:1 to about 50:1; or about 10:1 to about 20:1; or 20:1 to about 1000:1, or about 20:1 to about 500:1; or about 20:1 to about 200:1; or about 20:1 to about 100:1; or about 20:1 to about 50:1; or 50:1 to about 1000:1, or about 50:1 to about 500:1; or about 50:1 to about 200:1; or about 50:1 to about 100:1 based on the concentration of epoxide groups in the composition.

In other embodiments, the solid polymer electrolyte of the disclosure as described in any of the above embodiments is wherein the poly(ethylene glycol) bisglycidyl ether has a number-averaged molecular weight ($M_n$) of about 100 g/mol to about 1000 g/mol; or about 300 g/mol to about 1000 g/mol; or about 300 g/mol to about 700 g/mol; or about 400 g/mol to about 600 g/mol; or about 500 g/mol to about 550 g/mol.

In particular embodiments, the solid polymer electrolyte of the disclosure as described in any of the above embodiments is wherein the cross-linker comprises (i) 4,4'-methylenebiscyclohexaneamine and (ii) triethylenetetramine, tris (2-aminoethyl)amine, ethylenediamine, or a mixture thereof. In other particular embodiments, the cross-linker is 4,4'-methylenebiscyclohexaneamine and triethylenetetramine. In other particular embodiments, the cross-linker is 4,4'-methylenebiscyclohexaneamine and tris(2-aminoethyl) amine. In other particular embodiments, the cross-linker is 4,4'-methylenebiscyclohexaneamine and ethylenediamine. In yet other embodiments, the cross-liner is didentate nucleophile L-cysteine, which serves as a curing agent for a PEGDGE based ymer system. The sulfur in the amino acid side chain and the free amine nitrogen act to open the epoxide rings of the diglycidyl ether; the bidentate nature of the compound is necessary to link one PEGDGE chain to another in extension of the polymer. Other diamine, dithiol, and thioamine structures are expected to work similarly, and the chemistry should be applicable to additional diglycidyl ether compounds.

In other cases, the crosslinkers can include, in addition to the diamines already listed: water, diethylene glycol, glycerol, ethylene glycol, and other di- and polyols, or compounds with both alcohol and amine groups, or acid and amine groups, or amino acids. This approach may improve the solubility of electrolytic salts by using solvents that are also able to crosslink the polymer matrix of a solid polymer electrolyte with the result being a relatively highly conductive solid suitable for use in multifunctional composite materials or other power storage devices. Accordingly, a new formulation of a lithium-polyethylene oxide solid polymer electrolyte may allow for (1) use of water as a cross-linking "solvent," where the water is an integral part of the polymer matrix and therefore not subject to ready evaporation; (2) high conductivity (e.g., up to 10-5 S/cm) since large amounts of electrolytic salts can be dissolved in the solvent; and (3) access to inexpensive solid polymer electrolytes, since cheap, water-soluble salts such as lithium chloride may be used. Specific solvents may include water, diethylene glycol, polyethylene glycol (PEG) (e.g., $M_n$=200), ethylene glycol, glycerol, and other alcohols with at least two —OH groups. Generally, PEG can also be used in place of PEGDGE in chain lengths ($M_n$) of up to 10,000 (n=10,000). In some cases, short-chain PEG, with $M_n$ of 200 or less, can also be used as a solvent or as a plasticizer. In the present disclosure, many of the solvents listed can also be considered plasticizers, including PC.

In other particular embodiments of the solid polymer electrolyte of the disclosure as described above, the cross-linker comprises 4,4'-methylenebiscyclohexaneamine.

In other embodiments, the solid polymer electrolyte of the disclosure as described in any of the above embodiments is wherein the ion salt is the lithium salt. Suitable lithium salt that can be used in the disclosure is lithium bromide, lithium chloride, and lithium iodide, lithium hexafluoroarsenate(V), lithium hexafluorophosphate, lithium bis(trifluoromethyl sulfonyl)imide, lithium borohydride, lithium dihydrogenphosphate, lithium tetrafluoroborate, lithium metaborate, lithium perchlorate, lithium thiophenolate, lithium trifluoromethanesulfonate, lithium phosphate, lithium hydrogen phosphate, lithium sulfate, lithium hydrogen sulfate, lithium alkyl phosphates, lithium alkyl sulfates, lithium sulfonates, lithium bis(oxalate)borate, lithium salts of amino acids, lithium pyruvate, lithium anthranilate, other lithium salts with charge-delocalized anions, or a mixture thereof. In particular embodiments, the lithium salt is lithium bis(trifluoromethyl sulfonyl)imide. The ion salt, including the lithium salt, may be present at a concentration of about 0.01 M to about 2.0 M or, in some cases, up to about 6 M; or about 0.1 M to about 1.5 M or about 0.1 M to about 1.0 M; or about 0.5 M to about 2.0 M; or about 0.5 M to about 1.5M; or about 0.5 M to about 1.0 M; or about 0.75 M to about 1.25 M.

In certain embodiments, the solid polymer electrolyte of the disclosure as described in any of the above embodiments further comprises a second polymer. Such polymer will be suitable in preparing a polymer blend. Exemplary polymers include, but are not limited to poly[dimethylsiloxane-co-methyl(3-hydroxypropyl)siloxane]-graft-poly(ethylene glycol) methyl ether, poly(dimethylsiloxane), hydroxy terminated, siloxane polymers, polyvinyl alcohol and its derivatives, and the like.

In one aspect, the disclosure provides prepolymer compositions comprising an ion salt selected from the group consisting of a lithium, a magnesium, an ammonium salt, and a combination thereof; a bis-epoxide selected from the group consisting of poly(ethylene glycol) bisglycidyl ether, bisphenol A diglycidyl ether, resorcinol diglycidyl ether, polydimethyl siloxane bisglycidyl ether, and mixtures thereof; and a solvent.

In one embodiment, the prepolymer compositions of the disclosure is wherein the bis-epoxide is selected from the group consisting of poly(ethylene glycol) bisglycidyl ether, poly(lactic acid) diglycidyl ether, resorcinol diglycidyl ether, polydimethyl siloxane bisglycidyl ether, and mixtures thereof.

In other embodiments, the prepolymer of the disclosure is wherein the bis-epoxide is poly(ethylene glycol) bisglycidyl ether and one or more bis-epoxides selected from the group consisting of resorcinol diglycidyl ether, polydimethyl siloxane bisglycidyl ether, and mixtures thereof. In other embodiments, the prepolymer is where the bis-epoxide is poly (ethylene glycol) bisglycidyl ether and resorcinol diglycidyl ether. In certain embodiments, the poly(ethylene glycol) bisglycidyl ether and resorcinol diglycidyl ether are in a molar ratio of about 1:1 to about 1000:1, or about 1:1 to about 500:1; or about 1:1 to about 200:1; or about 1:1 to about 100:1; or about 1:1 to about 50:1; or about 1:1 to about 20:1; or about 1:1 to about 1:10; or about 1:1 to about 1:5; or about 1:1 to about 1:4; or about 1:1 to about 1:3; or about 1:1 to about 1:2; or 10:1 to about 1000:1, or about 10:1 to about 500:1; or about 10:1 to about 200:1; or about 10:1 to about 100:1; or about 10:1 to about 50:1; or about 10:1 to about 20:1; or 20:1 to about 1000:1, or about 20:1 to about 500:1; or about 20:1 to about 200:1; or about 20:1 to about 100:1; or about 20:1 to about 50:1; or 50:1 to about 1000:1, or about 50:1 to about 500:1; or about 50:1 to about 200:1; or about 50:1 to about 100:1 based on the concentration of epoxide groups in the composition.

In certain embodiments, the prepolymer of the disclosure is wherein the bis-epoxide is poly(ethylene glycol) bisglycidyl ether and polydimethyl siloxane bisglycidyl ether. In particular embodiments, the poly(ethylene glycol) bisglycidyl ether and polydimethyl siloxane bisglycidyl ether are in a molar ratio of about 1:1 to about 1000:1, or about 1:1 to about 500:1; or about 1:1 to about 200:1; or about 1:1 to about 100:1; or about 1:1 to about 50:1; or about 1:1 to about 20:1; or about 1:1 to about 1:10; or about 1:1 to about 1:5; or about 1:1 to about 1:4; or about 1:1 to about 1:3; or about 1:1 to about 1:2; or 10:1 to about 1000:1, or about 10:1 to about 500:1; or about 10:1 to about 200:1; or about 10:1 to about 100:1; or about 10:1 to about 50:1; or about 10:1 to about 20:1; or 20:1 to about 1000:1, or about 20:1 to about 500:1; or about 20:1 to about 200:1; or about 20:1 to about 100:1; or about 20:1 to about 50:1; or 50:1 to about 1000:1, or about 50:1 to about 500:1; or about 50:1 to about 200:1; or about 50:1 to about 100:1 based on the concentration of epoxide groups in the composition.

In another embodiment, the prepolymer compositions of the disclosure is wherein the bis-epoxide is poly(ethylene glycol) bisglycidyl ether and bisphenol A diglycidyl ether. In certain embodiments, the poly(ethylene glycol) bisglycidyl ether and bisphenol A diglycidyl ether are in a molar ratio of about 1:1 to about 1000:1, or about 1:1 to about 500:1; or about 1:1 to about 200:1; or about 1:1 to about 100:1; or about 1:1 to about 50:1; or about 1:1 to about 20:1; or about 1:1 to about 1:10; or about 1:1 to about 1:5; or about 1:1 to about 1:4; or about 1:1 to about 1:3; or about 1:1 to about 1:2; or 10:1 to about 1000:1, or about 10:1 to about 500:1; or about 10:1 to about 200:1; or about 10:1 to about 100:1; or about 10:1 to about 50:1; or about 10:1 to about 20:1; or 20:1 to about 1000:1, or about 20:1 to about 500:1; or about 20:1 to about 200:1; or about 20:1 to about 100:1; or about 20:1 to about 50:1; or 50:1 to about 1000:1, or about 50:1 to about 500:1; or about 50:1 to about 200:1; or about 50:1 to about 100:1 based on the concentration of epoxide groups in the composition.

In certain embodiments, the prepolymer composition of the disclosure as described above is wherein the poly (ethylene glycol) bisglycidyl ether has a number-averaged molecular weight (Mn) of about 100 g/mol to about 1000 g/mol; or about 300 g/mol to about 1000 g/mol; or about 300 g/mol to about 700 g/mol; or about 400 g/mol to about 600 g/mol; or about 500 g/mol to about 550 g/mol.

In particular embodiments, the prepolymer composition of the disclosure as described above is wherein the ion salt is the lithium salt. Suitable lithium salts include lithium bromide, lithium chloride, and lithium iodide, lithium hexafluoroarsenate(V), lithium hexafluorophosphate, lithium bis(trifluorornethyl sulfonyl)imide, lithium borohydride, lithium dihydrogenphosphate, lithium tetrafluoroborate, lithium metaborate, lithium perchlorate, lithium thiophenolate, and lithium trifluoromethanesulfonate, lithium phosphate, lithium hydrogen phosphate, lithium sulfate, lithium hydrogen sulfate, lithium alkyl phosphates, lithium alkyl sulfates, lithium sulfonates, lithium bis(oxalate)borate, lithium salts of amino acids, lithium pyruvate, lithium anthranilate, other lithium salts with charge-delocalized anions, or a mixture thereof. In other embodiments, the lithium salt is lithium bis(trifluoromethyl sulfonyl)imide.

In other particular embodiments, the prepolymer composition of the disclosure as described above where the lithium salt (or another ion salt) is present at a concentration of about 0.01 M to about 2.0 M or, in some cases, up to about 6 M; or about 0.1 M to about 1.5 M or about 0.1 M to about 1.0 M; or about 0.5 M to about 2.0 M; or about 0.5 M to about 1.5M; or about 0.5 M to about 1.0 M; or about 0.75 M to about 1.25 M.

In certain embodiments, the prepolymer composition of the disclosure as described in any of the above embodiments further comprises a cross-linker comprising 4,4'-methylenebiscyclohexaneamine, 3-aminophenyl sulfone, 4-aminophenyl sulfone, 1,2-diaminocyclohexane, tetramethylene diamine, hexamethylene diamine, bis(3-aminopropyl) amine, benzene 1,2-diamine, triethylenetetramine, tris(2-aminoethyl)amine, ethylenediamine, or a mixture thereof.

In certain embodiments, the prepolymer composition of the disclosure as described in any of the above embodiments further comprises a cross-linker comprising (i) 4,4'-methylenebiscyclohexaneamine and (ii) triethylenetetramine, tris (2-aminoethyl)amine, ethylenediamine, or a mixture thereof. In particular embodiments, the cross-linker is 4,4'-methylenebiscyclohexaneamine and triethylenetetramine. In other particular embodiments, the cross-linker is 4,4'-methylenebiscyclohexaneamine and tris(2-aminoethyl)amine. In other particular embodiments, the cross-linker is 4,4'-methylenebiscyclohexaneamine and ethylenediamine.

In particular embodiments of the prepolymer of the disclosure as described above, the cross-linker comprises 4,4'-methylenebiscyclohexaneamine.

In particular embodiments, the prepolymer composition of the disclosure as described above is wherein the solvent is dimethyl carbonate, diethyl carbonate, propylene carbonate, ethylene carbonate, vinylene carbonate, methyl ethyl carbonate, dipropyl carbonate, butylene carbonate, dibutyl carbonate, ethylene glycol, diethylene glycol, lactide, glycolide or a mixture thereof. In other embodiments, the solvent is propylene carbonate. Solvent amounts can range from 0.01% to 100% by volume of PEGDGE or its equivalent.

In particular embodiments, the prepolymer composition of the disclosure as described above further comprises one or more of a plasticizer. Exemplary plasticizers include, but are not limited to, sebacates, adipates, maleates, and dibutyl ester-based plasticizers.

In other embodiments, the prepolymer composition of the disclosure as described above further comprises a second polymer.

In certain embodiments, the prepolymer composition of the disclosure further comprises a solid additive. Suitable solid additives include, but are not limited to single or multiwall carbon nanotubes, aluminum oxide nanoparticles, strontium titanate, barium strontium titanate (various formulations), reduced graphene oxide, activated carbon, carbon black and the like. Carbon nanotubes can be blended into the prepolymer composition by sonication, increasing the specific capacitance of the supercapacitor without diminishing the mechanical properties. In a particular embodiment, the prepolymer composition of the disclosure further comprises aluminum oxide nanoparticles.

Generally, high conductivity in solid polymer electrolytes is desirable for optimal performance in power storage devices. High concentrations of lithium salts within the polymer electrolyte matrix may contribute to high conductivity, but can be hampered by the limitations of lithium salt solubility in the pre-polymer solution. In various embodiments, lithium concentrations in solid polymer electrolytes may be maximized by (1) preparing a saturated salt solution at the outset of prepolymer preparation, (2) blending the salt into the solvent, and the salt solution into the polymer, using gentle magnetic or mechanical stirring along with sonication, and (3) sonicating at low (−15 to 10 deg C.) temperatures to prevent premature curing (solidification) of the prepolymer solution.

Additionally, in some embodiments, the incorporation of non-carbonate solvents, such as water, ethylene glycol, diethylene glycol, glycerol, ethylene glycol, and other di- and polyols, and short-chain polyethylene glycol), as well as siloxane plasticizers, can improve the performance of solid polymer electrolyte, particularly in its role in our supercapacitor-like power storage device. These components can increase conductivity, capacitance, and leakage resistance.

In preparing solid polymer electrolytes from diglycidyl ethers, and in other epoxy resin preparations, diamine curing agents such as PACM (4,4'-methylenebiscyclohexanamine) can be used for chain elongation, resulting in solidification of a prepolymer mixture. In some cases, PACM can use hydrogen bonding to cross-link polyethylene glycol chains, without substantially elongating the polymer chain. Other diamine, diol, aminoalcohol, and amino acid compounds can act as hydrogen bond cross-linking agents as well. The ion salt, particularly when used in high concentrations, may also participate in cross-linking the polyethylene glycol matrix. PACM amounts can range from 1:1 (mole ratio) to PEGDGE or its equivalent, up to 20:1.

In one aspect, the disclosure provides capacitors comprising of a first carbon fiber electrode, a second carbon fiber electrode, a solid polymer electrolyte as described in any of the above embodiment, and a separator layer, wherein the separator layer is disposed between the first carbon fiber electrode and second carbon fiber electrode, the solid polymer electrolyte is disposed between the first carbon fiber electrode and the separator layer, and the solid polymer electrolyte is disposed between the second carbon fiber electrode and the separator layer.

In one embodiment of the capacitor of the disclosure, each carbon fiber electrode is an activated carbon fiber electrode, has carbon nanotubes grown on the side oriented toward the separator, or has a thin layer of carbon black applied on the carbon fiber electrode on the side oriented toward the separator. In specific embodiments, each carbon fiber electrode is an activated carbon fiber electrode.

In one embodiment, each carbon fiber electrode comprises a plurality of carbon nanotubes. Such nanotubes may be oriented vertically on the carbon fiber electrode. The density and height of the carbon nanotubes ranges between low and high densities/heights. The carbon fiber may comprise any suitable weave. Exemplary weave includes but is not limited to traditional, biaxial, triaxial, and the like. Such triaxial weave may be lighter than the biaxial weave.

In another embodiment of the disclosure, each carbon fiber electrode of the capacitor comprises a current collector layer.

In yet another embodiment of the disclosure, the current collector layer contains copper, aluminum, silver, or any highly conductive, low resistance material. In certain embodiments, the current collector layer contains at least one of copper, aluminum, and silver. In particular embodiment, the current collector layer is a copper or aluminum layer.

In certain embodiments, the separator layer of the capacitor allows ionic flow and inhibits electron flow between the electrodes. In other embodiments, the separator layer of the capacitor only allows certain ions to flow through. In particular embodiment, the separator layer is a filter paper, a tissue paper, or a microporous monolayer poly(propylene) membrane. In other particular embodiments, the separator layer is a microporous monolayer poly(propylene) membrane. In yet other embodiments, the separator layer comprises cellular materials.

In certain embodiments, the separator layer/ion permeable membrane of the capacitor is Celgard 3501.

In certain embodiments, the capacitor disclosed herein may be at least partially enclosed with a coating. At least partially enclosing the capacitor with the coating may help increase the leakage resistance of the capacitor.

In certain embodiments, the capacitor may be substantially entirely enclosed with the coating. In such an embodiment, substantially the entire external surface of the capacitor, but the electrical leads coupled to the electrodes, may be enclosed.

In certain embodiments, the coating may be a film coating. Such a film coating may be a resin. Alternatively, the film coating may be one or more laminate sheets. In such an embodiment, the film coating may be a "thin" film coating that is less than or equal to approximately one millimeter in thickness. Exemplary thickness of the "thin" film coating may be between about 0.01 mm to about 1 mm, about 0.05 mm to about 1 mm, about 0.1 mm to about 1 mm, about 0.2 mm to about 1 mm, about 0.3 mm to about 1 mm, about 0.4 mm to about 1 mm, about 0.5 mm to about 1 mm, about 0.6 mm to about 1 mm, about 0.7 mm to about 1 mm, about 0.8 mm to about 1 mm, about 0.9 mm to about 1 mm, about 0.01 mm to about 0.9 mm, about 0.05 mm to about 0.9 mm, about 0.1 mm to about 0.9 mm, about 0.2 mm to about 0.9 mm, about 0.3 mm to about 0.9 mm, about 0.4 mm to about 0.9 mm, about 0.5 mm to about 0.9 mm, about 0.6 mm to about 0.9 mm, about 0.7 mm to about 0.9 mm, about 0.8 mm to about 0.9 mm, about 0.01 mm to about 0.5 mm, about 0.05 mm to about 0.5 mm, about 0.1 mm to about 0.5 mm, about 0.01 mm to about 0.6 mm, about 0.05 mm to about 0.6 mm, about 0.1 mm to about 0.6 mm, about 0.01 mm to about 0.7 mm, about 0.05 mm to about 0.7 mm, or about 0.1 mm to about 0.7 mm, or about 0.1 mm, or about 0.2 mm, or about 0.3 mm, or about 0.4 mm, or about 0.5 mm, or about 0.6 mm, or about 0.7 mm, or about 0.8 mm, or about 0.9 mm, or about 1 mm.

In certain embodiments, the coating may include an insulating polymer. Examples of insulating polymers include polyamide (e.g., nylon), polyethylene, polypropylene, polystyrene, polyvinylidene fluoride (in some cases polyvinylidene fluoride is used as an adhesive, in particular for enhancing the surface area of the electrodes), poly(tetrafluoroethylene), and various polyesters, among other examples. Alternatively, the coating may include a polar polymer such as an epoxy resin, among other examples. The coating may include other materials as well, such as polyoxydiphenylene-pyromellitimide (Kapton).

Figure 11A:
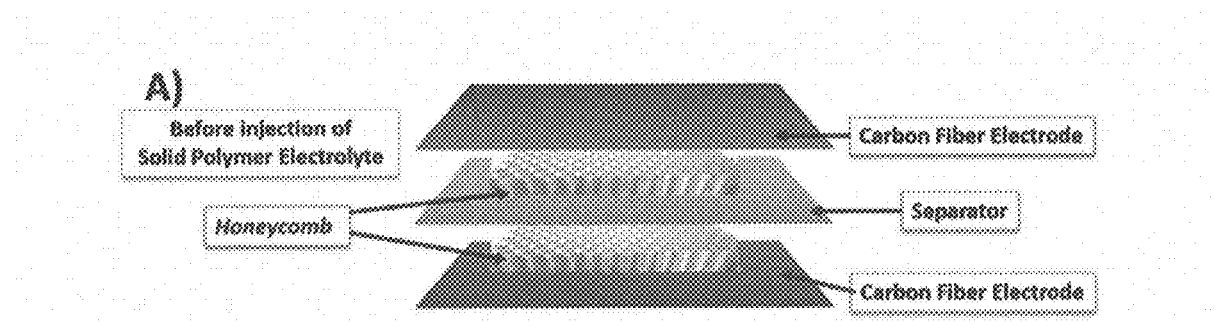
FIGS. 11A and 11B illustrate construction details of the present structural supercapacitor design.
Figure 11B:
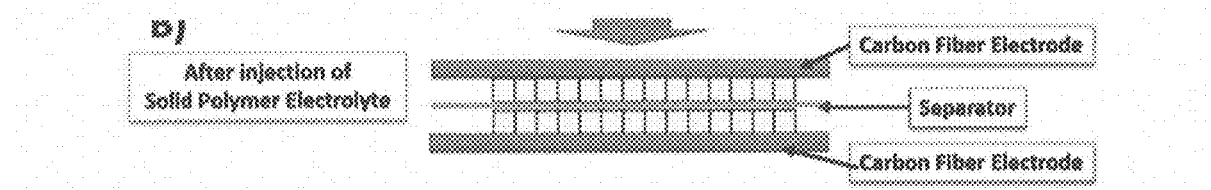

FIGS. 11A and 11B illustrate construction details of the present structural supercapacitor design. As illustrated, the structure includes carbon fiber electrodes, with a honeycomb structure or layer disposed between the carbon fiber electrodes. The honeycomb structure can include one or more layers of identical, similar or different materials. Generally, the honeycomb structure includes materials that are of insulant, porous, or conductive materials. The materials making up the honeycomb structure can include repeating patterns of shapes to give the honeycomb structure enhanced strength, while reducing the overall weight of the honeycomb structure and providing openings into which the polymer electrolyte can flow. The repeating patterns of shapes may include repetitive hexagonal patterns (as observed in natural honeycombs), or patterns with different angles such as three angles (making triangular shapes), four angles (making square shapes), five angles (making pentagonal shapes), seven angles (making sept-agonal shapes) or eight angles (making octagonal shapes).

A solid polymer electrolyte is then injected in the structure that includes the two carbon fiber electrodes and layers of honeycomb material. After injection of the solid polymer electrolyte, and tightening or fastening of all elements together, a low temperature curing operation strengthens the supercapacitor into a rugged solid structure. After the overall structure has been cured, the two honeycomb materials maintain constant a predetermined distance between the two electrodes and the separator, thereby largely enhancing the process control, to yield stable and reproducible structures.

In various embodiments, the honeycomb material may be incorporated into the supercapacitor by the following methods. First, the electrodes may be impregnated with SPE and allowed to cure. Then the honeycomb material may be laid on one electrode, filled with SPE, with the second electrode being placed on top, pressure applied, then vacuum, then heat to cure. Alternatively, the honeycomb material may be filled with SPE and allowed to cure. Then an electrode can be soaked in SPE, the honeycomb/SPE membrane applied, and a second soaked electrode is placed on top; pressure is applied, then vacuum, then heat to cure. Alternatively, the honeycomb material may also be affixed to the electrode via 3D printing.

As illustrated, FIG. 11A is a view of the supercapacitor structure before injection of the solid polymer electrolyte. After the solid polymer electrolyte is injected, the structure is tightened, and cured as represented FIG. 11B. Such a rugged structure lends itself to the integration of multiple layers.

Figure 12A:
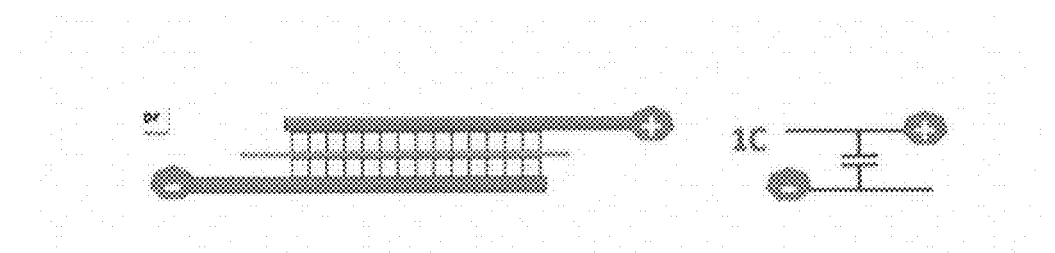
FIGS. 12A-12C show different supercapacitor structure designs incorporating different numbers of layers.
Figure 12B:
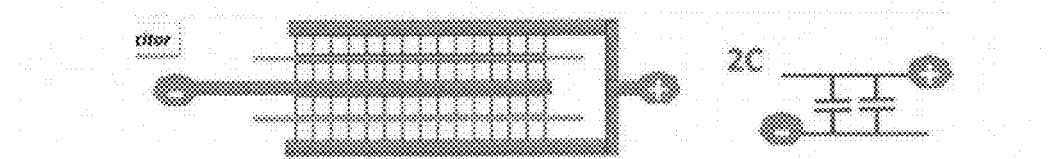
Figure 12C:
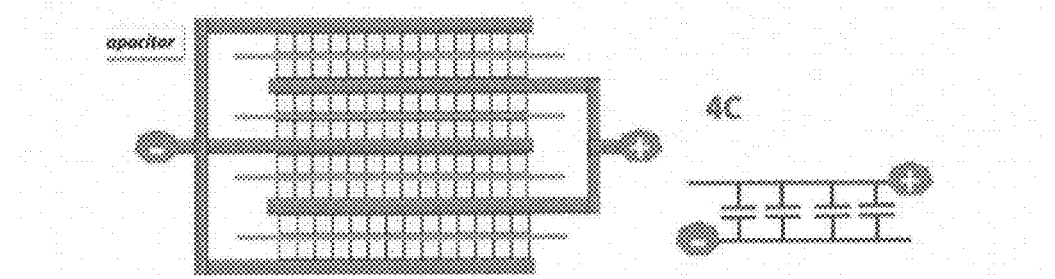

To illustrate, FIGS. 12A-12C show different supercapacitor structure designs incorporating different numbers of layers. A supercapacitor structure having a single layer is shown in FIG. 12A. A double supercapacitor having two different layers of materials is illustrated in FIG. 12B, while a quadruple supercapacitor is illustrated in FIG. 12C. The interconnections of the electrodes alternate between anodes (+) and cathodes (−) together to keep a parallel architecture, and additive capacitors, for increase capacitance. Alternatively, the interconnections of the electrodes can be done so that a series architecture is achieved, for increased voltage.

Figures 13, 14:
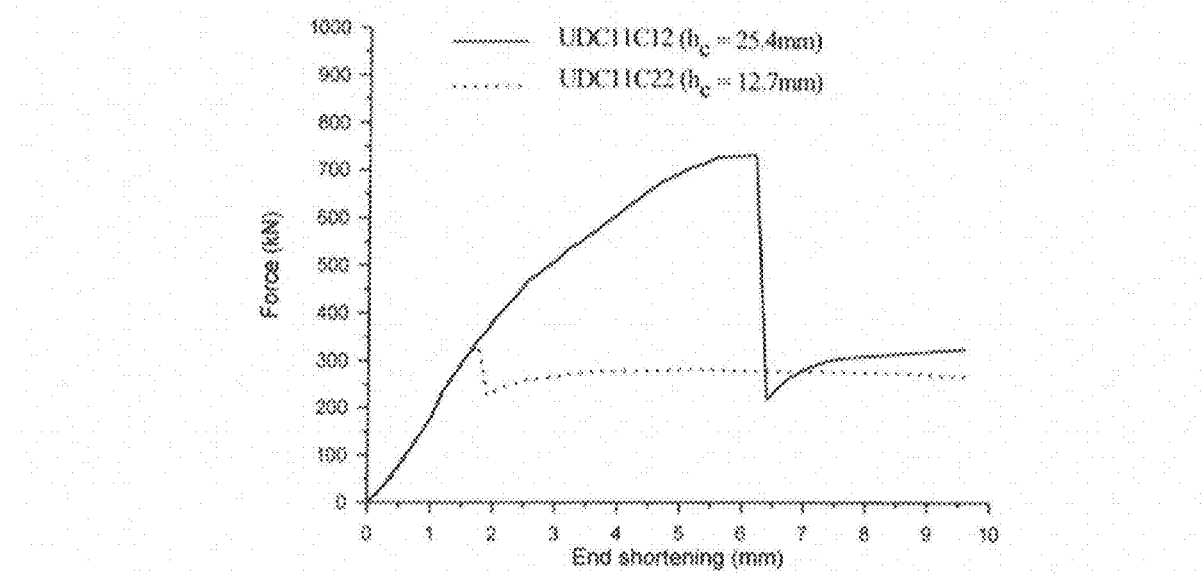
FIG. 13 depicts the bending stiffness, strength and weight comparison between non-honeycomb and two honeycomb composites with a 3:1 thickness ratio.
FIG. 14 depicts the effect of honeycomb core height on the uniaxial compression response of sandwiched panels.

When integrated into the supercapacitor structure as described herein, the honeycomb structures have a stiffness that outperforms other structures' specific stiffness, when calculated as stiffness per density. In some cases, it can be assumed that the stiffness of multi layered honeycomb structural supercapacitors is roughly proportional with the number of layers, hence the double supercapacitor of FIG. 12B has a bending stiffness that is approximately twice the one from a single supercapacitor (FIG. 12A), and half the stiffness of a quadruple supercapacitor (FIG. 12C). Such a proportionality assumption has validity if the number of layers stays relatively small to keep the thickness of the supercapacitor small, compared to its surface area. However, the supercapacitor's stiffness may be increased even more because the further away the material is distributed from its neutral axis, the higher its bending stiffness, which depends on the third power of the sandwich thickness (i.e. the dimension normal to the bending axis). In addition, an increased height of the honeycomb core has the potential to increase the collapse strength under uniaxial compression. To illustrate, FIG. 13 depicts the bending stiffness, strength and weight comparison between non-honeycomb and two honeycomb composites with a 3:1 thickness ratio. FIG. 14 depicts the effect of honeycomb core height on the uniaxial compression response of sandwiched panels.

Consequently, the present supercapacitor structure that uses multi layered honeycomb layers can have significantly higher capacitance and stiffness, which increase at least proportionally with the number of honeycomb layers. The honeycomb layers also maintain the distance between electrodes and the separator constant, and they protect the integrity of the separator.

Within the present supercapacitor design, there are several types of solid polymer electrolytes (SPEs). Examples are described herein and include dry polymer electrolytes, or polymer-salt electrolytes, and all are true solids. Typically, a polymer-salt electrolyte contains PEO or polypropylene oxide (PPO) along with an electrolytic salt, with the solid matrix acting as the solvent. Especially in the case of PEO, the matrix tends to be quite crystalline, rendering polymer-salt electrolytes quite rigid in most cases. Plasticized polymer-salt electrolytes are polymer-salt electrolytes with a plasticizer added in to diminish the crystallinity of the solid. Polymer-gel electrolytes contain either a liquid solvent or large amounts of plasticizer, providing a gel-like consistency. Rubbery electrolytes, or polymer-in-salt electrolytes, contain large amounts of salt with small quantities of polymer. Composite polymer electrolytes include micro- or nanoscale particles dispersed throughout the electrolyte; composites may be made from any of the preceding electrolyte types. The SPE described herein is a plasticized polymer-salt electrolyte with the mechanical properties of a dry polymer electrolyte displaying a compression strength of 2 MPa or higher; composite polymer electrolytes have also been prepared based on the described formula.

An SPE can be prepared by dissolving a conductive salt, e.g. lithium bis (trifluormethane) sulfonimide (LiTFSI) in a small amount of propylene carbonate (PC, a plasticizer). The reagent providing the polyethylene glycol (PEG) matrix for the electrolyte, polyethylene glycol diglycidyl ether (PEGDGE), is then added to the mixture (in some cases PEGDGE may be replaced by poly(ethylene glycol) (PEG), poly(lactic acid) (PLA), or poly(glycolic acid) (PGA)), followed by a polysiloxane-PEG block copolymer (a plasticizer with conductive properties). The polymer matrix may include, in addition to PEG, PLA, and/or PGA: poly(valerolactone) (PVL) or related polylactone structures. LiTFSI concentrations of up to 356 mmol, or a 1:2 Li:O ratio (including oxygens from all components of the SPE), dissolved in up to 30 mL of solvent, blended with 30 g of PEGDGE and 6.9 g or less of PACM allowed for conductivities of up to $5 \times 10^{-4}$ S/cm. This formulation has a lithium concentration of just under 6 M. Samples with 1:11, 1:7, and 1:5 Li:O ratios also gave conductivities in the $10^{-4}$ S/cm range. Comparable formulations of LiCl in a 1:5 Li:O ratio also gave conductivities in the $10^{-4}$ S/cm range.

After thorough blending, a curing agent (PACM, a diamine) is added and a final mixing is performed. At this point, the polymer mixture is an uncured liquid that is applied to the electrode surface as necessary. Upon heating (80° C., 2 h), the polymer cures in and on the electrode surface. In other cases, LiCl may be blended in a small amount of H2O), with PEGDGE being added, then PACM being added as a curing agent. Once the PEGDGE is added, the mixture is cooled and kept cold for addition of PACM. Mixing is done by a combination of mechanical/magnetic stirring and sonication.

Typically, solid electrolytes can suffer from having poor contact with the electrodes in power storage devices, in part because the electrolyte is commonly fabricated as a film that is then laid upon an electrode. As a result, there may be little surface area bringing the electrode and electrolyte into contact. In contrast, liquid electrolytes, as described herein, are able to access a greater level of the electrode surface area. Because the presently described polymers cure slowly at room temperature, the polymers are able to saturate the electrode surface with the liquid polymer mixture, taking advantage of the high level of electrode-electrolyte contact afforded to a liquid electrolyte. The electrode impregnated with the electrolyte is then cured, so that the electrolyte maintains its contact with fibers of the electrode as it solidifies. Because the SPE is formed while making contact with a high percentage of the surface area of the electrode, any issues of contact-based resistance at the electrode-electrolyte interface are minimized.

Two plasticizers are present in a formulation of the SPE. PC is relatively low molecular weight, but can be employed because of its ability to rapidly solvate the lithium salt. In this formulation, PC may serve as a solvent and a plasticizer. In some cases, other solvents, such as DEG, glycerol, and ethylene glycol may also act as plasticizers.

In the present supercapacitor, electrical power storage is achieved by embedding the functionality of a supercapacitor—or electric double layer capacitor in the material microstructure. The present structure includes a new multifunctional material construct in which a honeycomb structure is interposed 1) between the electrodes and the separator of the capacitor, or 2) between the electrodes of the capacitor. In the latter case, the need for a separator may be eliminated as the electrolyte plays a double role—electrolyte and separator. This construction can 1) significantly increase the material's (and the capacitor's) mechanical strength in bending and compression and can 2) facilitate the encapsulation of a gel electrolyte part or all of the honeycomb cells, which may increase the power and energy density of the material by means of the higher ionic conductivity of the gel electrolyte.

Figure 15A:
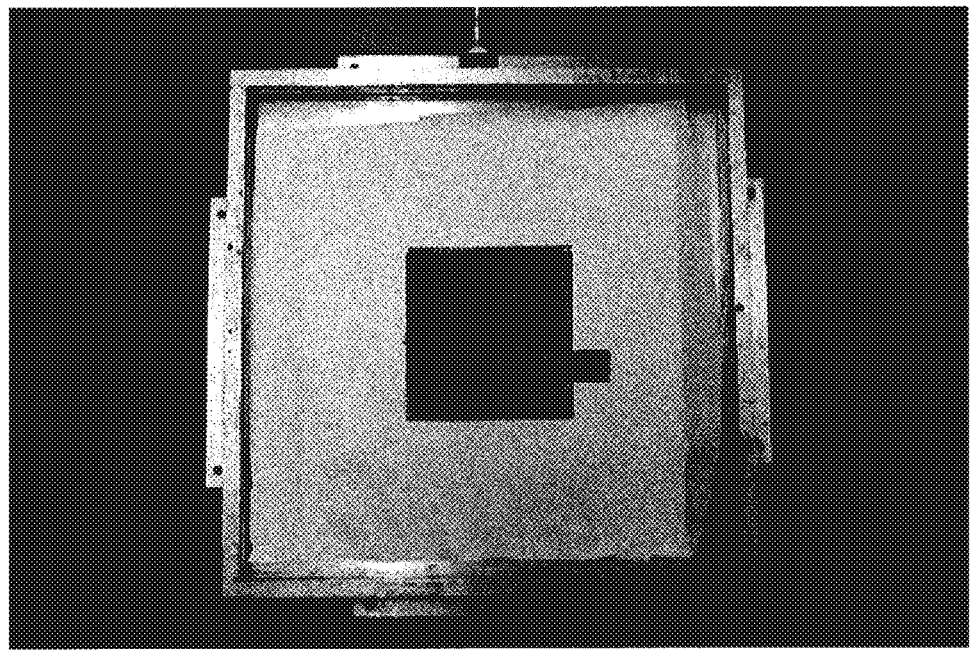
FIGS. 15A-15J illustrate steps in fabricating the present supercapacitor structure.
Figure 15B:
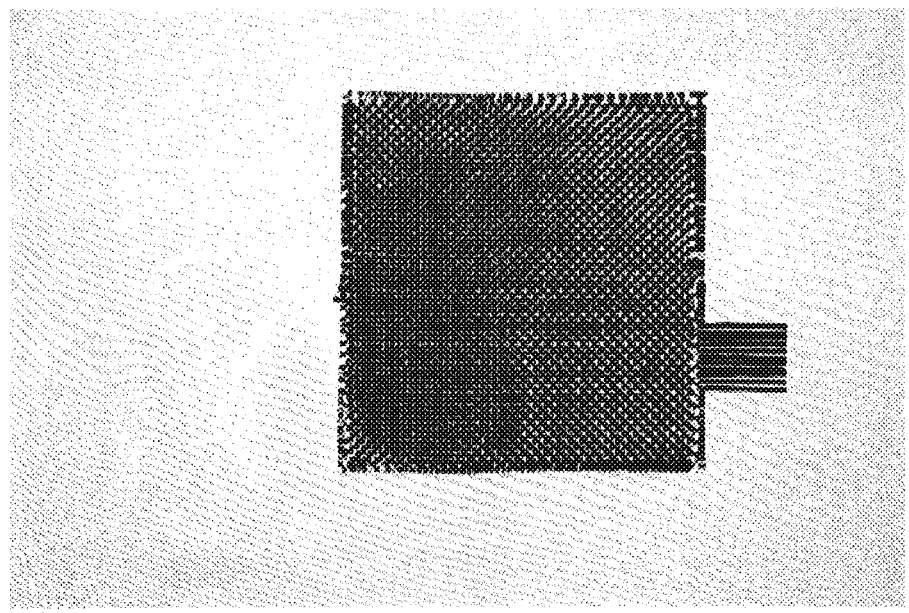

FIGS. 15A-J illustrate steps in fabricating the present supercapacitor structure. In FIG. 15A, a window frame vacuum mold is provided and a carbon-based electrode, constructed in accordance with the teachings of the present disclosure is disposed within the window frame vacuum mold. As illustrated, the honeycomb leaves a portion of the carbon-based electrode exposed, to serve as current collector, as illustrated in further detail in FIG. 15B.

Figure 15C:
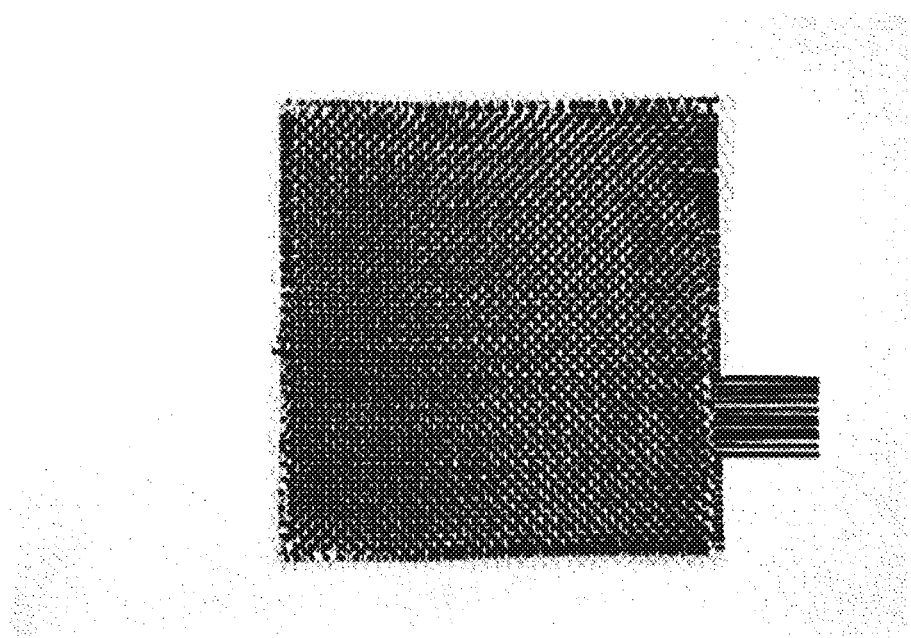

The carbon-based electrode is then soaked with a solid polymer electrolyte material configured in accordance with the present disclosure. The soaked carbon-based electrode is illustrated in FIG. 15C.

Figure 15D:
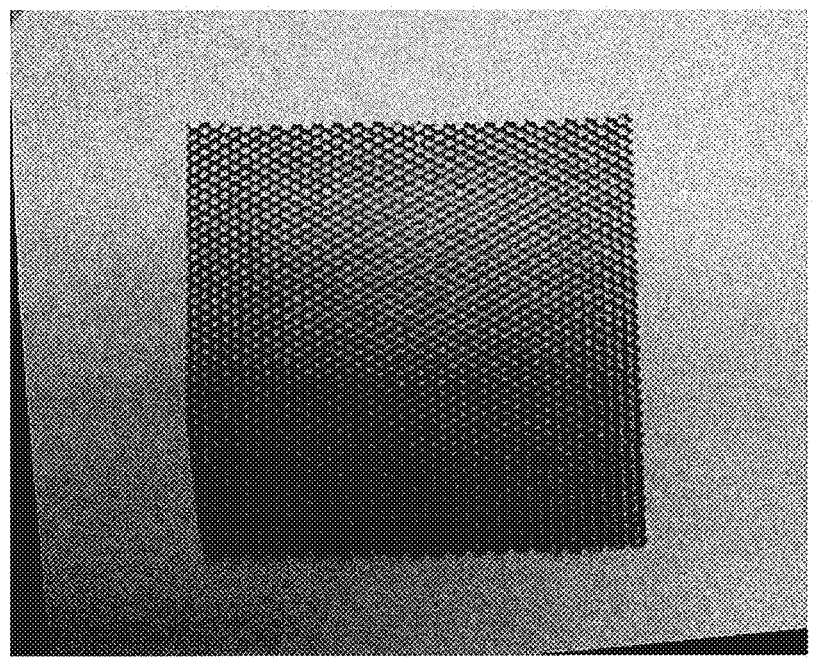
Figure 15E:
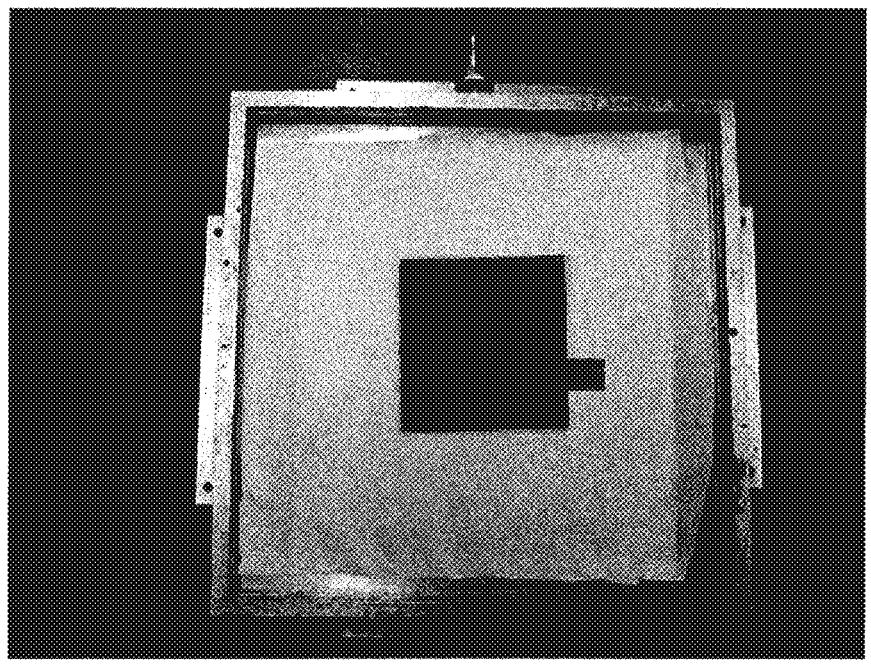

With the carbon-based electrode soaked in solid polymer electrolyte material, as shown in FIG. 15D, a honeycomb separator structure, configured in accordance with the present disclosure, is positioned on top of the soaked carbon-based electrode. FIG. 15E depicts the honeycomb separator structure positioned over the soaked carbon-based electrode within the window frame.

Figure 15F:
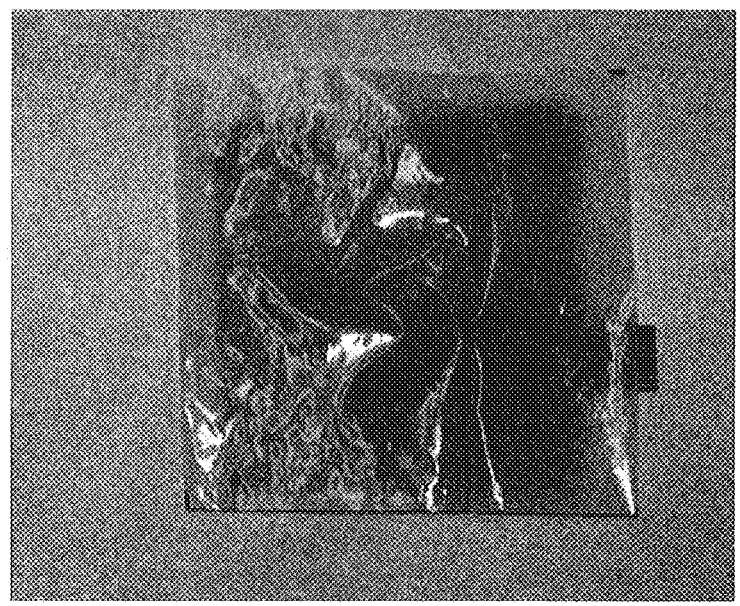

Next, the honeycomb separator is now soaked in solid polymer electrolyte and an optional ion-permeable membrane may be positioned over the soaked honeycomb separator (FIG. 15F shows this combination including the ion-permeable membrane).

Figure 15G:
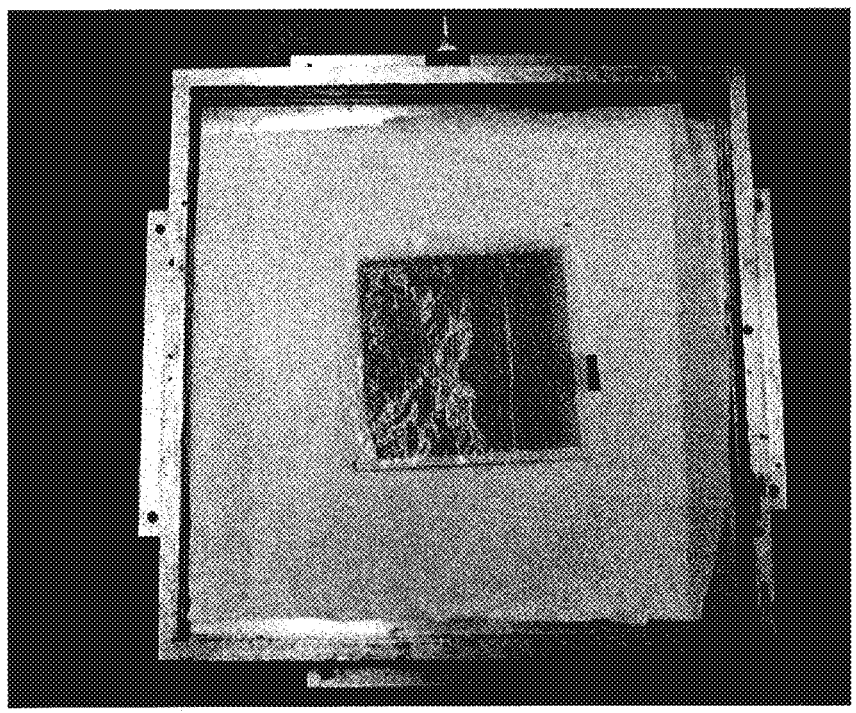
Figure 15H:
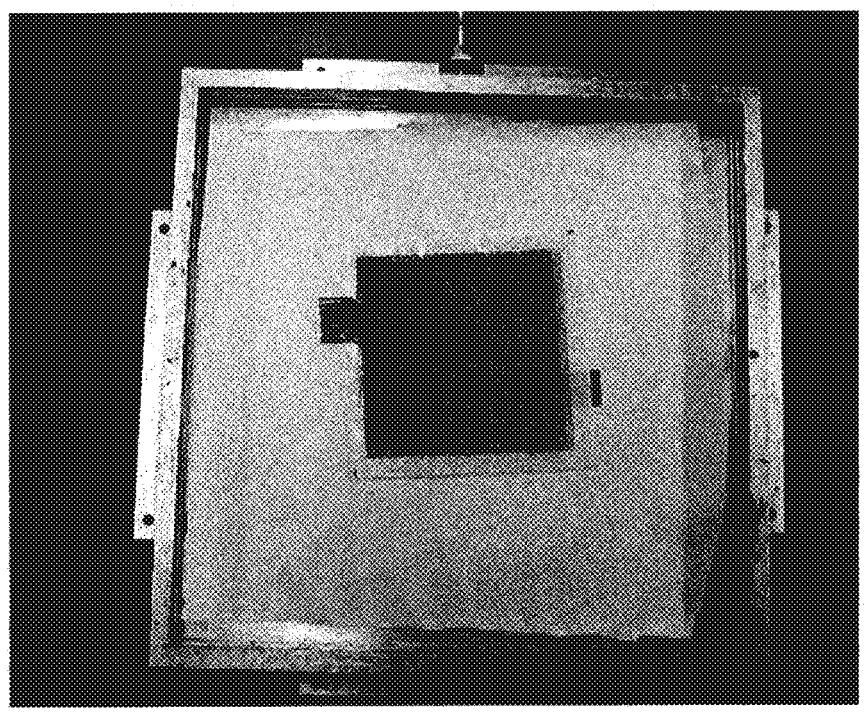

After the ion-permeable membrane has been placed, as illustrated by FIG. 15G, a second honeycomb separator is positioned over the ion-permeable membrane. The second honeycomb separator is then soaked in solid polymer electrolyte and, as illustrated in FIG. 15H, a second carbon-based electrode is then positioned over the second honeycomb separator. The second carbon-based electrode is then soaked in solid polymer electrolyte.

After this step, the supercapacitor structure, including two carbon-based electrodes and two honeycomb separators between the carbon-based electrodes, as well as an optional ion-permeable membrane separating the honeycomb separators has been formed. Furthermore the various components of the supercapacitor structure have been soaked in solid polymer electrolyte.

Figure 15I:
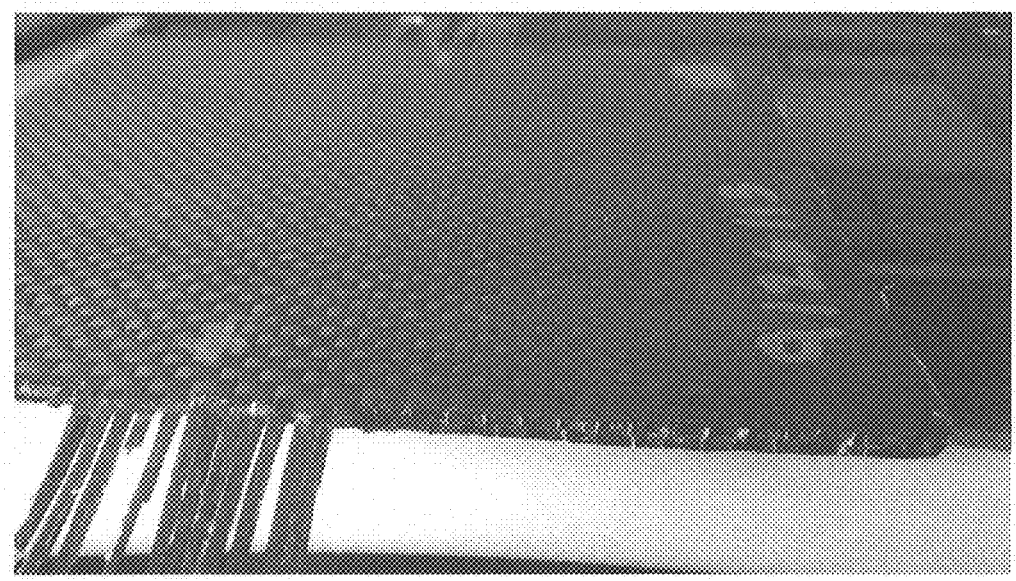
Figure 15J:
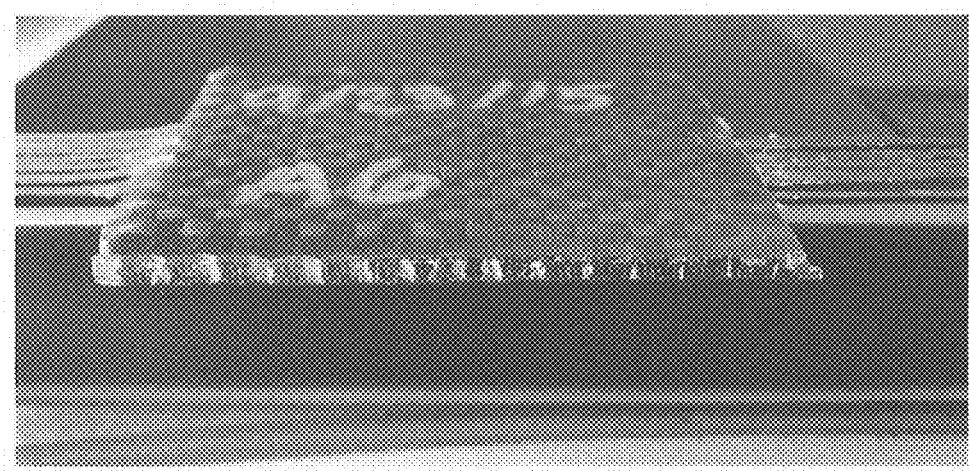

In order to form the final supercapacitor structure, the sandwich structure is cured. This may involve placing the entire structure into a vacuum seal mold and placing the entire mold into a heated press to promote curing. After curing the supercapacitor structure is removed from the mold and can be installed into the target system. FIGS. 15I and 15J show the cured supercapacitor structure.

In another aspect, the disclosure provides methods for preparing a capacitor comprising assembling a stack comprising a first carbon fiber electrode, a second carbon fiber electrode, a prepolymer composition as described in any of the above embodiments, and a separator layer, wherein the separator layer is disposed between the first carbon fiber electrode and second carbon fiber electrode, and wherein the prepolymer composition is disposed between the first carbon fiber electrode and the separator layer, and the prepolymer composition is disposed between the second carbon fiber electrode and the separator layer; and compressing the stack.

In one embodiment, the stack comprising of two or more of the capacitors as described above is assembled prior to compressing. Optionally, an insulating resin together with a sheet of glass fiber may be applied between the positive electrode of one capacitor and the negative electrode of another capacitor. In addition of providing more charge storage capacity, the stack of two or more of the capacitors may provide to higher mechanical load carrying capacity for the capacitor material.

In one embodiment of the method for preparing a capacitor, the compressing either of the stacks referred above is at a temperature between about 20° C. and about 100° C., or between about 30° C. and about 100° C., between about 40° C. and about 100° C., between about 50° C. and about 100° C., between about 60° C. and about 100° C., between about 70° C. and about 100° C., between about 80° C. and about 100° C., between about 90° C. and about 100° C. between about 20° C. and about 90° C., or between about 30° C. and about 90° C., between about 40° C. and about 90° C., between about 50° C. and about 90° C., between about 60° C. and about 90° C., between about 70° C. and about 90° C., between about 80° C. and about 90° C., between about 20° C. and about 80° C., or between about 30° C. and about 80° C., between about 40° C. and about 80° C., between about 50° C. and about 80° C., between about 60° C. and about 80° C., between about 70° C. and about 80° C., between about 20° C. and about 70° C., or between about 30° C. and about 70° C. between about 40° C. and about 70° C., between about 50° C. and about 70° C., between about 60° C. and about 70° C., between about 20° C. and about 60° C., or between about 30° C. and about 60° C., between about 40° C. and about 60° C., or between about 50° C. and about 60° C., or about 20° C., about 25° C., about 30° C., about 35° C., about 40° C., about 45° C., about 50° C., about 55° C., about 60° C., about 65° C., about 70° C., about 75° C., about 80° C., about 85° C., about 90° C., about 95° C., or about 100° C.

In one embodiment of the method for preparing a capacitor, the compressing either of the stacks referred above is at pressure between 0.5 MPa and 4.5 MPa, between 0.5 MPa and 4 MPa, between 0.5 MPa and 3.5 MPa, between 0.5 MPa and 3 MPa, between 0.5 MPa and 2.5 MPa, between 0.5 MPa and 2 MPa, between 0.5 MPa and 1.5 MPa, between 0.5 MPa and 1 MPa, 1 MPa and 4.5 MPa, between 1 MPa and 4 MPa, between 1 MPa and 3.5 MPa, between 1 MPa and 3 MPa, between 1 MPa and 2.5 MPa, between 1 MPa and 2 MPa, between 1 MPa and 1.5 MPa, 1.5 MPa and 4.5 MPa, between 1.5 MPa and 4 MPa, between 1.5 MPa and 3.5 MPa, between 1.5 MPa and 3 MPa, between 1.5 MPa and 2.5 MPa, between 1.5 MPa and 2 MPa, 2 MPa and 4.5 MPa, between 2 MPa and 4 MPa, between 2 MPa and 3.5 MPa, between 2 MPa and 3 MPa, between 2 MPa and 2.5 MPa, 2.5 MPa and 4.5 MPa, between 2.5 MPa and 4 MPa, between 2.5 MPa and 3.5 MPa, or between 2.5 MPa and 3 MPa, or about 0.5 MPa, about 1 MPa, about 1.5 MPa, about 2 MPa, about 2.5 MPa, about 3 MPa, about 3.5 MPa, about 4 MPa, or about 4.5 MPa.

In one embodiment of the method for preparing a capacitor, the compressing either of the stacks referred above is at vacuum pressures between 0.5 and 2 atm, between 1 and 2 atm, between 1.5 and 2 atm, between 0.5 and 1.5 atm, between 1 and 1.5 atm, or about 0.5 atm, about 1 atm, about 1.5 atm, or about 2 atm.

The compression may involve two separate pressures, one is the vacuum pressure that is used to remove air bubbles from the layup, for example, at a pressure of less than 1 atm (e.g., between 0.3 and 0.9 atmospheres). The second pressure is the compressional pressure under which the curing occurs, which may occur, for example, at a pressure between about 1 MPa and about 300 MPa. The pressures may be applied for a period of time suitable to assemble the stack, for example, each pressure may be applied for between about 1 minute and 16 hours or between about 30 minutes and 16 hours.

In one embodiment, the method for preparing a capacitor is wherein the first carbon fiber electrode and the second carbon fiber electrode are soaked in the prepolymer composition prior to assembly of the stack.

In one embodiment, the method for preparing a capacitor uses three dimensional printing. In an exemplary, non-limiting embodiment a current collector sheet may be first bonded to a triaxial carbon fiber weave, creating the electrodes and current collectors, followed by a 3-D printing technique to print composite resin in a honeycomb-like structure on the exposed triaxial carbon fiber weave. The cavities existent in the honeycomb are filled with electrolyte, which could be gel or solid like. The structural strength may come from the honeycomb composite resin structure. Then, two electrodes with the honeycomb structure may be assembled with a separator in between. The height of the honeycomb will vary between several tens and several hundreds of nanometers. In addition to an increase in charge storage capacity, an increase in mechanical load carrying capacity may also occur due to the honeycomb structure.

In another aspect, the disclosure provides methods for preparing a solid polymer electrolyte comprising adding to a composition comprising a solvent, an ion salt selected from the group consisting of a lithium, a magnesium, and an ammonium salt, and a bis-epoxide selected from the group consisting of poly(ethylene glycol) bisglycidyl ether, poly (lactic acid) diglycidyl ether, bisphenol A diglycidyl ether, resorcinol diglycidyl ether, polydimethyl siloxane bisglycidyl ether, and mixtures thereof, a cross-linker comprising 4,4'-methylenebiscyclohexaneamine, 3-aminophenyl sulfone, 4-aminophenyl sulfone, 1,2-diaminocyclohexane, tetramethylene diamine, hexamethylene diamine, bis(3-aminopropyl)amine, benzene 1,2-diamine, triethylenetetramine, tris(2-aminoethyl)amine, ethylenediamine, or a mixture thereof; and heating the composition.

In one embodiment, the method for preparing the solid polymer electrolyte of the disclosure is wherein the bis-epoxide is selected from the group consisting of poly (ethylene glycol) bisglycidyl ether, resorcinol diglycidyl ether, polydimethyl siloxane bisglycidyl ether, and mixtures thereof.

In certain embodiments of the disclosure, the method is wherein the bis-epoxide is poly(ethylene glycol) bisglycidyl ether and one or more bis-epoxides selected from the group consisting of poly(lactic acid) diglycidyl ether, resorcinol diglycidyl ether, polydimethyl siloxane bisglycidyl ether, and mixtures thereof.

In particular embodiments, the method of the disclosure as described above is wherein the bis-epoxide is poly (ethylene glycol) bisglycidyl ether and resorcinol diglycidyl ether. In certain embodiments, the poly(ethylene glycol) bisglycidyl ether and resorcinol diglycidyl ether are in a molar ratio of about 1:1 to about 1000:1, or about 1:1 to about 500:1; or about 1:1 to about 200:1; or about 1:1 to about 100:1; or about 1:1 to about 50:1; or about 1:1 to about 20:1; or about 1:1 to about 1:10; or about 1:1 to about 1:5; or about 1:1 to about 1:4; or about 1:1 to about 1:3; or about 1:1 to about 1:2; or 10:1 to about 1000:1, or about 10:1 to about 500:1; or about 10:1 to about 200:1; or about 10:1 to about 100:1; or about 10:1 to about 50:1; or about 10:1 to about 20:1; or 20:1 to about 1000:1, or about 20:1 to about 500:1; or about 20:1 to about 200:1; or about 20:1 to about 100:1; or about 20:1 to about 50:1; or 50:1 to about 1000:1, or about 50:1 to about 500:1; or about 50:1 to about 200:1; or about 50:1 to about 100:1 based on the concentration of epoxide groups in the composition.

In particular embodiments, the method of the disclosure as described above is wherein the bis-epoxide is poly (ethylene glycol) bisglycidyl ether and polydimethyl siloxane bisglycidyl ether. In certain embodiments, the poly (ethylene glycol) bisglycidyl ether and polydimethyl siloxane bisglycidyl ether are in a molar ratio of about 1:1 to about 1000:1, or about 1:1 to about 500:1; or about 1:1 to about 200:1; or about 1:1 to about 100:1; or about 1:1 to about 50:1; or about 1:1 to about 20:1; or about 1:1 to about 1:10; or about 1:1 to about 1:5; or about 1:1 to about 1:4; or about 1:1 to about 1:3; or about 1:1 to about 1:2; or 10:1 to about 1000:1, or about 10:1 to about 500:1; or about 10:1 to about 200:1; or about 10:1 to about 100:1; or about 10:1 to about 50:1; or about 10:1 to about 20:1; or 20:1 to about 1000:1, or about 20:1 to about 500:1; or about 20:1 to about 200:1; or about 20:1 to about 100:1; or about 20:1 to about 50:1; or 50:1 to about 1000:1, or about 50:1 to about 500:1; or about 50:1 to about 200:1; or about 50:1 to about 100:1 based on the concentration of epoxide groups in the composition.

In particular embodiments, the method of the disclosure as described above is wherein the bis-epoxide is poly (ethylene glycol) bisglycidyl ether and bisphenol A diglycidyl ether. In certain embodiments, the poly(ethylene glycol) bisglycidyl ether and bisphenol A diglycidyl ether are in a molar ratio of about 1:1 to about 1000:1, or about 1:1 to about 500:1; or about 1:1 to about 200:1; or about 1:1 to about 100:1; or about 1:1 to about 50:1; or about 1:1 to about 20:1; or about 1:1 to about 1:10; or about 1:1 to about 1:5; or about 1:1 to about 1:4; or about 1:1 to about 1:3; or about 1:1 to about 1:2; or 10:1 to about 1000:1, or about 10:1 to about 500:1; or about 10:1 to about 200:1; or about 10:1 to about 100:1; or about 10:1 to about 50:1; or about 10:1 to about 20:1; or 20:1 to about 1000:1, or about 20:1 to about 500:1; or about 20:1 to about 200:1; or about 20:1 to about 100:1; or about 20:1 to about 50:1; or 50:1 to about 1000:1, or about 50:1 to about 500:1; or about 50:1 to about 200:1; or about 50:1 to about 100:1 based on the concentration of epoxide groups in the composition.

In particular embodiments, the method of the disclosure as described above is wherein the poly(ethylene glycol) bisglycidyl ether has a number-averaged molecular weight (Mn) of about 100 g/mol to about 1000 g/mol; or about 300 g/mol to about 1000 g/mol; or about 300 g/mol to about 700 g/mol; or about 400 g/mol to about 600 g/mol; or about 500 g/mol to about 550 g/mol.

In other embodiments, the method of the disclosure as described above is wherein the ion salt is the lithium salt. In another embodiment, the lithium salt is lithium bromide, lithium chloride, and lithium iodide, lithium hexafluoroarsenate(V), lithium hexafluorophosphate, lithium bis(trifluoromethyl sulfonyl)imide, lithium borohydride, lithium dihydrogenphosphate, lithium tetrafluoroborate, lithium metaborate, lithium perchlorate, lithium thiophenolate, lithium trifluoromethanesulfonate, lithium phosphate, lithium hydrogen phosphate, lithium sulfate, lithium hydrogen sulfate, lithium alkyl phosphates, lithium alkyl sulfates, lithium sulfonates, lithium bis(oxalate)borate, lithium salts of amino acids, lithium pyruvate, lithium anthranilate, other lithium salts with charge-delocalized anions, or a mixture thereof. In particular embodiments, the lithium salt is lithium bis(trifluoromethyl sulfonyl)imide. In other embodiments, the lithium salt is present at a concentration of about 0.01 M to about 2.0 M; or about 0.1 M to about 1.5 M or about 0.1 M to about 1.0 M; or about 0.5 M to about 2.0 M; or about 0.5 M to about 1.5M; or about 0.5 M to about 1.0 M; or about 0.75 M to about 1.25 M.

In particular embodiments of the method of the disclosure as described above, the cross-linker comprises (i) 4,4'-methylenebiscyclohexaneamine and (ii) triethylenetetramine, tris(2-aminoethyl)amine, ethylenediamine, or a mixture thereof. In other particular embodiments, the cross-linker is 4,4'-methylenebiscyclohexaneamine and triethylenetetramine. In other particular embodiments, the cross-linker is 4,4'-methylenebiscyclohexaneamine and tris(2-aminoethyl)amine. In other particular embodiments, the cross-linker is 4,4'-methylenebiscyclohexaneamine and ethylenediamine.

In particular embodiments of the method of the disclosure as described above, the cross-linker comprises 4,4'-methylenebiscyclohexaneamine.

In certain embodiments, the method of the disclosure as described above is wherein the solvent is dimethyl carbonate, diethyl carbonate, propylene carbonate, ethylene carbonate, vinylene carbonate, methyl ethyl carbonate, dipropyl carbonate, butylene carbonate, dibutyl carbonate, ethylene glycol, diethylene glycol, lactide, glycolide or a mixture thereof. In other embodiments, the solvent is propylene carbonate.

In certain embodiments, the method of the disclosure as described above embodiments is where the solution further comprises a second polymer as described above.

In particular embodiments of the method of the disclosure as described above, preparing the solid polymer electrolyte comprises mixing the solvent, the lithium salt, and the bis-epoxide by sonication. In an exemplary, non-limiting embodiment, the method comprises sonicating the solvent, the lithium salt, and the bis-epoxide; adding the cross-linker to obtain the composition; sonicating the composition; and heating the composition.

EXAMPLES

Materials and Fabrication

Structural supercapacitors were fabricated using 3 k carbon fiber (2×2 twill) for electrodes, copper mesh as current collectors, Grade 1 and Q2 filter paper, glass microfiber, polypropylene monolayer membrane as separator, together with several formulations of solid polymer electrolyte (SPE) as matrix. Each separator tested had different porosity and thickness, and, except for the glass microfiber and polypropylene separators, they were all cellulose based. The Celgard separators used in this study have a monolayer polypropylene base. Unlike in a dielectric capacitor, in this case, the thickness of the separator is not critical for achieving high capacitance as the charges are stored at the SPE-electrode interfaces. However, from an energy density standpoint, the thinner and stronger the separator, the better the overall energy density of the structural EDLC.

Several SPE formulations have been tested. These SPEs combined a poly(ethylene glycol) diglycidyl ether (PEGDGE) (average Mn 526) base with a lithium salt (Li(NSO2CF3)2, also abbreviated as LiTFSI) dissolved in propylene carbonate (PC) and curing agents (including Amicure PACM), 4,4'-methylenebiscyclohexanamine, and triethylenetetramine (TETA)). Bisphenol A diglycidyl ether (BPADGE) or resorcinol diglycidyl ether (RESDGE) were also used along with PEGDGE in block copolymer formulations to improve stiffness. One additional formulation was a polymer blend, the components of which are proprietary, and is referred to herein as SPE with PB. All of the SPEs were prepared by first dissolving the Li salt in PC (and the polymer blend component in that formulation). Then the PEGDGE and any BPADGE or RESDGE was added to the salt solution and sonicated until homogeneous. Finally, the curing agent was added immediately prior to layup of the EDLCs.

SPE formulations were also prepared with addition of solid particles, such as carbon nanotubes and alumina nanoparticles.

A process similar to that of composite materials layup has been followed for the structural EDLC fabrication. The supercapacitors were assembled in a picture frame mold, with SPE being applied to each additional layer, in the following order: copper terminal, carbon fiber electrode, separator, carbon fiber electrode, copper terminal. The assembled picture frame mold, connected to a vacuum pump, was then placed in an autoclave-style heated press to cure the EDLCs.

Electrical Characterization

Capacitance Measurement

Figure 2A:
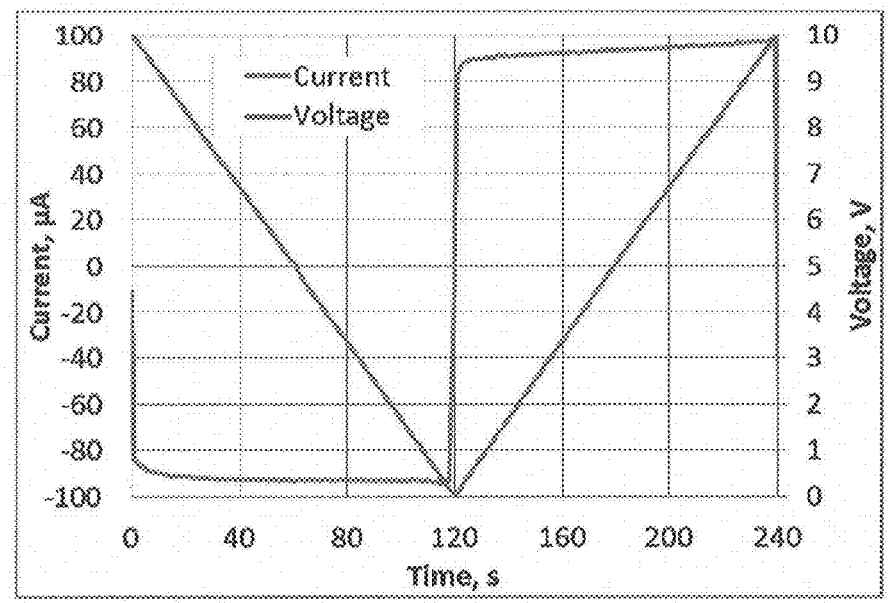
FIG. 2A shows current and voltage for the full charge-discharge cycle of a 1 mF "ideal" capacitor at a rate of 83.3 mV/sec.
Figure 2B:
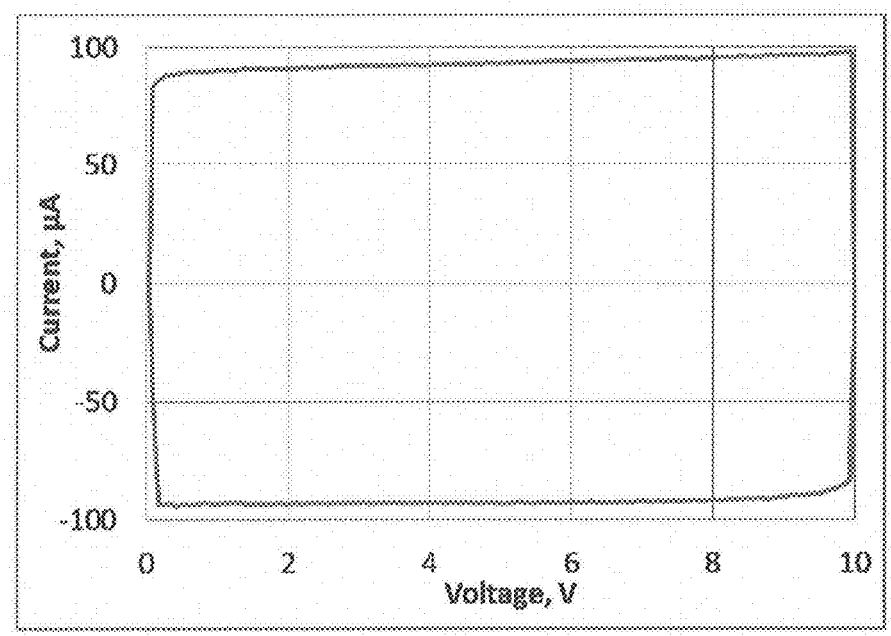
FIG. 2B shows the cyclic voltammetrey (CV) response of an "ideal" capacitor.

Capacitance measurement was performed using cyclic voltammetry (CV). The method consists in the application of a constant positive current during the charging phase of the capacitor, and of a constant negative current during the discharge phase, while simultaneously measuring the voltage across the capacitor. If "an ideal" capacitor is measured, the charging—discharging should result in a linear variation of the voltage, as shown in FIG. 2A; plotting current against voltage results in the CV curve shown in FIG. 2B.

Figure 3A:
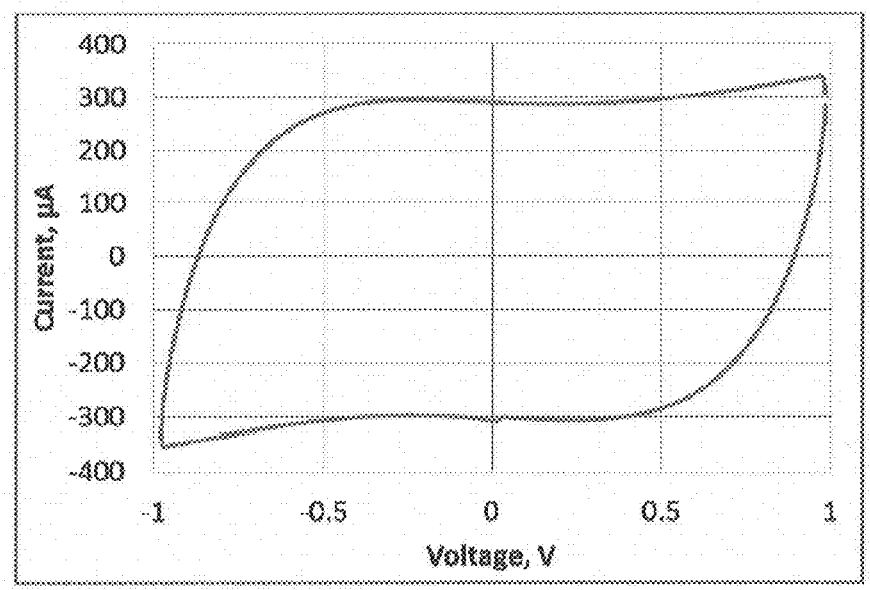
FIG. 3A shows the CV for a 60 mF factory EDLC charged between −1V to 1V at a rate of 8.33 mV/s.
Figure 3B:
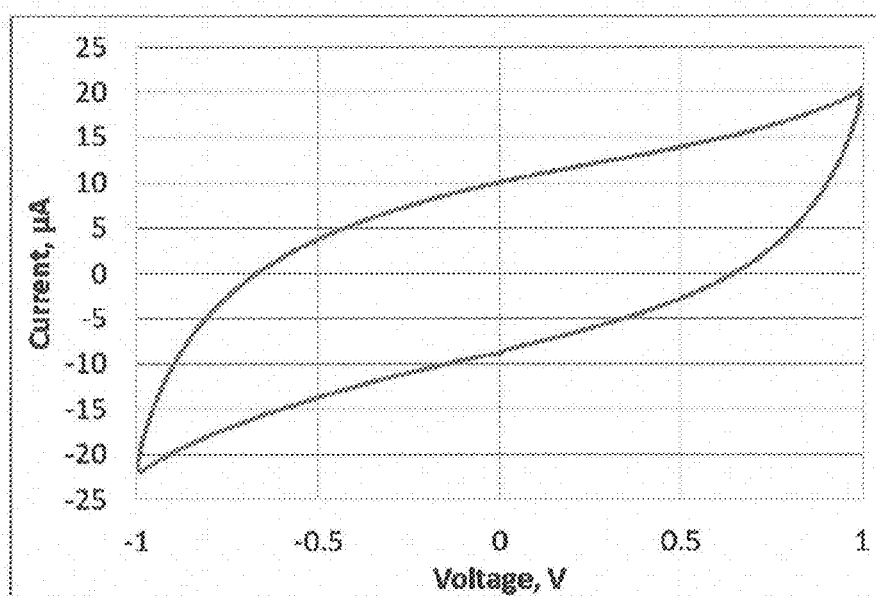
FIG. 3B shows a CV for a structural EDLC with a polypropylene membrane separator, charged between −1 and 1V at a rate of 8.33 mV/s.

The CV curve may be used to make qualitative inferences on the magnitude of the leakage resistance and ESR of the capacitor. Cyclic voltammetry curves for a factory EDLC and for one of the structural EDLCs are shown in FIGS. 3A and 3B, respectively. High ESR will tend to make the top left and bottom right corners rounded (FIG. 3A), while low leakage resistance will tend to skew the graph vertically (FIG. 3B). Qualitatively speaking, these CV's indicate that both EDLCs have fairly high ESR and that the structural EDLC has significant leakage, i.e. low leakage resistance.

In order to calculate capacitance, as the ratio between the applied constant current and the change in voltage over time (i.e., the slope of the voltage curve), the amount of current that is charging the capacitor is measured. Due to the highly nonlinear nature of the CV as can be seen in FIGS. 3A and 3B, the point at which the current is measured can affect drastically the capacitance calculations. Also, note that at the top-right corner of the graph, the majority of the current is being leaked out rather than charging the capacitor. Therefore, one way to mitigate this is to measure the current when the voltage across the capacitor is 0. When the voltage across the capacitor is zero, the leakage current is zero as well, meaning that no current is leaking out at this point. Accordingly, using the current at zero voltage for capacitance calculations will eliminate the leakage effect.

Leakage Resistance Evaluation

Figure 4:
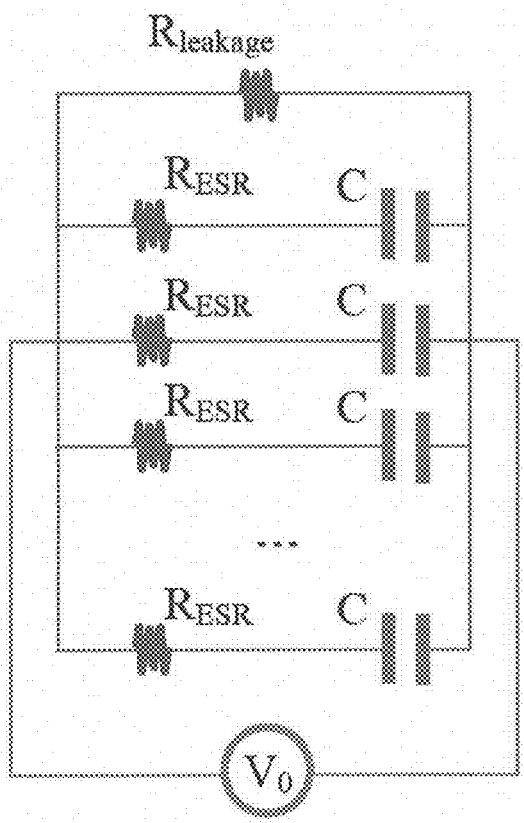
FIG. 4 illustrates electrical diagram of a typical EDLC.
Figure 5:
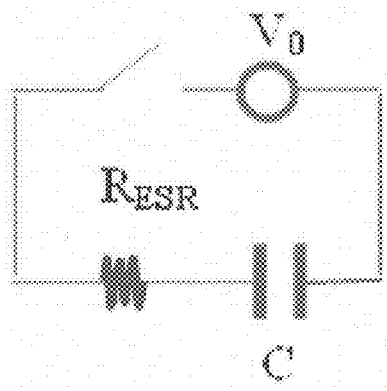
FIG. 5 illustrates a single branch of an EDLC with an applied step voltage.

To measure leakage resistance, the voltage across the capacitor (which includes capacitive as well as resistive elements as shown in FIG. 4) is held constant, and then the current required to keep that voltage constant is measured. For example, if an EDLC is initially discharged and a constant voltage of $V_0$ is applied instantly, the voltage across the capacitor is the sum of the voltage across the ESR and that across the capacitor (FIG. 5). In one branch of the capacitor (FIG. 5), the voltage across the capacitor is initially 0 because the capacitor is assumed to be fully discharged; then, the voltage comes from the ESR, which draws a current from the power source. The amount of current drawn by the ESR is calculated as $i=V_0/R_{ESR}$ according to Ohm's law. This current then charges the capacitor, increasing the voltage across it. As this happens, the voltage across the ESR decreases by an equal amount, keeping the total voltage across the branch equal to $V_0$. Eventually, the voltage across ESR goes to zero and that across the capacitor goes to $V_0$. Once this happens, no current travels through this branch.

However, in the branch containing the leakage resistance, there are no capacitive elements (see FIG. 4). Thus, the voltage across the leakage resistance is equal to $V_0$ at all times. Once the other branches (with capacitive elements) have been fully charged, they do not draw any more current from the power supply. Then, the EDLC will still require a current to stay charged to the same voltage, and all of this current will be travelling through the branch having only resistive elements. The resistance of these resistive elements, which is leakage resistance, can be determined easily by holding the voltage constant and measuring the amount of current required to maintaining this level of charge. The voltage to current ratio gives the leakage resistance of the EDLC. It can take days for the capacitor to fully charge, the charging duration affecting the leakage resistance evaluation as the EDLCs can have branches with very high ESR. In this example, capacitors were charged with a constant voltage for an average of 12 hours.

Mechanical Characterization

Tensile tests were performed to evaluate the ultimate tensile strength and modulus of elasticity for the power storage composite and for a composite made with the same type of carbon fiber weave and West System 105 epoxy instead of SPE. Also, no separator was included in the latter. The tests were performed on material coupons with the cross section approximately 7.5 mm2 (i.e., 15 mm wide and approximately 0.5 mm thick). FR4 tabs, with tapered edges (according to ASTM D 3039), were attached to the ends of the composite coupons to avoid material damage during gripping of the specimens/coupons. All tests were carried out until catastrophic failure occurred.

Three point bending tests were also performed. These tests provided insight onto the flexural stiffness and strength of the power storage composites as well as on the delamination resistance and flexural failure modes of the material. A modified version of ASTM D 790 was used to determine the flexural properties of the power storage composites as well as the standard composite materials.

Results

Figure 6:
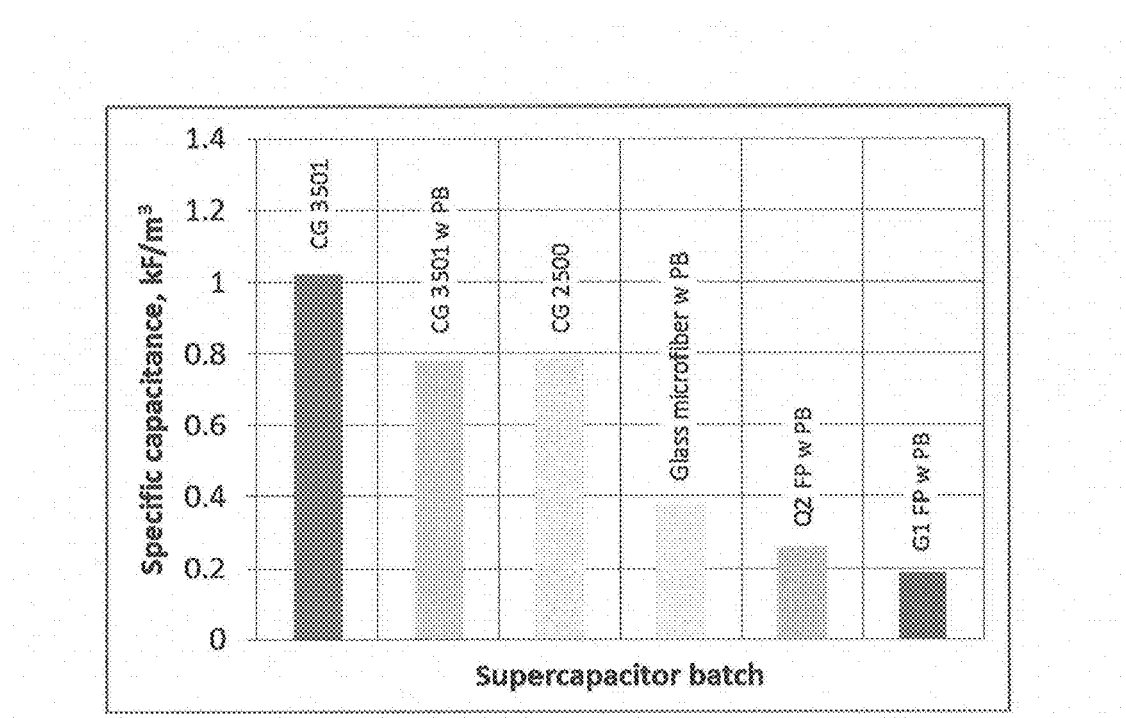
FIG. 6 shows the effect of separator material/ion permeable membrane on the specific capacitance at a Li salt concentration of 95 micromoles of salt per gram of poly-ethylene glycol) diglycidyl ether (PEGDGE).
Figure 7:
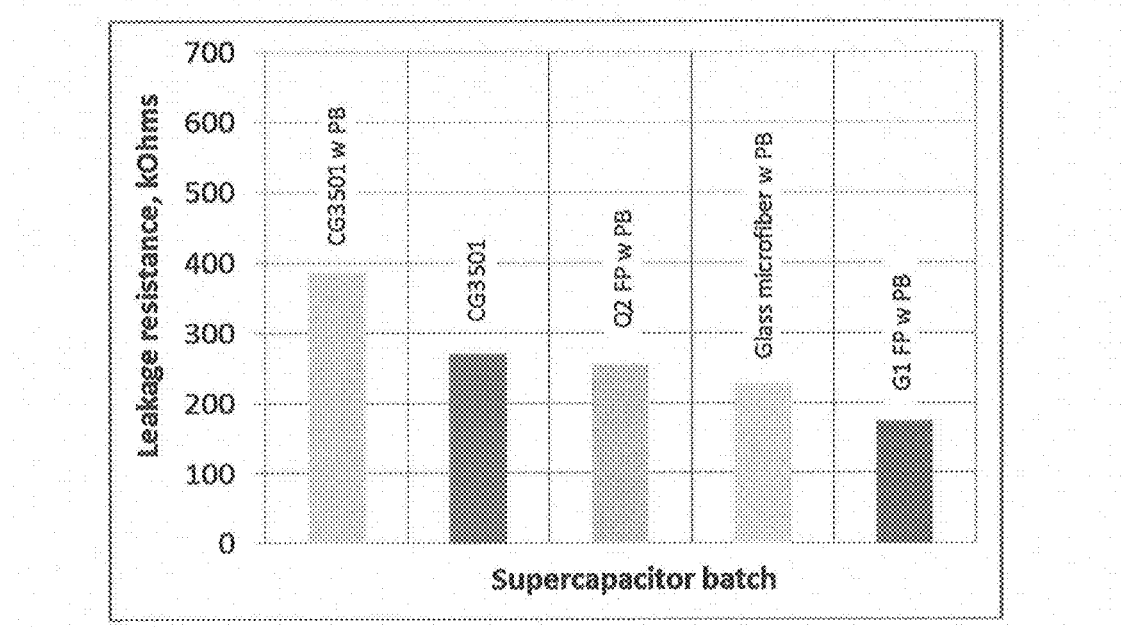
FIG. 7 shows the effect of separator material/ion permeable membrane on leakage resistance at a Li salt concentration of 95 micromoles of salt per gram of PEGDGE.

Structural EDLCs have been manufactured with different types of separators and with two distinct SPE formulations. The SPE was formulated with and without a polymer blend, identified in the subsequent plots as PB. The amount of Lilm used in the SPE formulation was varied to evaluate its effect on capacitance and leakage resistance. Experimental data for all types of separator materials has been acquired for the SPE with a salt amount of 0.75 g which corresponds to approximately 95 micromoles of Li salt per grams of PEGDGE. From this data, summarized in FIGS. 6 and 7, and from the summary of the mechanical tests, was concluded that Celgard 3501 is the best separator material for the structural supercapacitor. FIG. 6 shows that Celgard 2500 is also a good choice for the separator material; but, during three point bending tests, delamination has been observed, hence this separator was not used in subsequent batches. FIG. 6 also indicates that structural supercapacitors made with regular SPE and Celgard 3501 exhibited highest capacitance per unit volume, while the supercapacitors made with SPE with PB and Celgard 3501 recorded slightly lower capacitance per unit volume.

Figure 8:
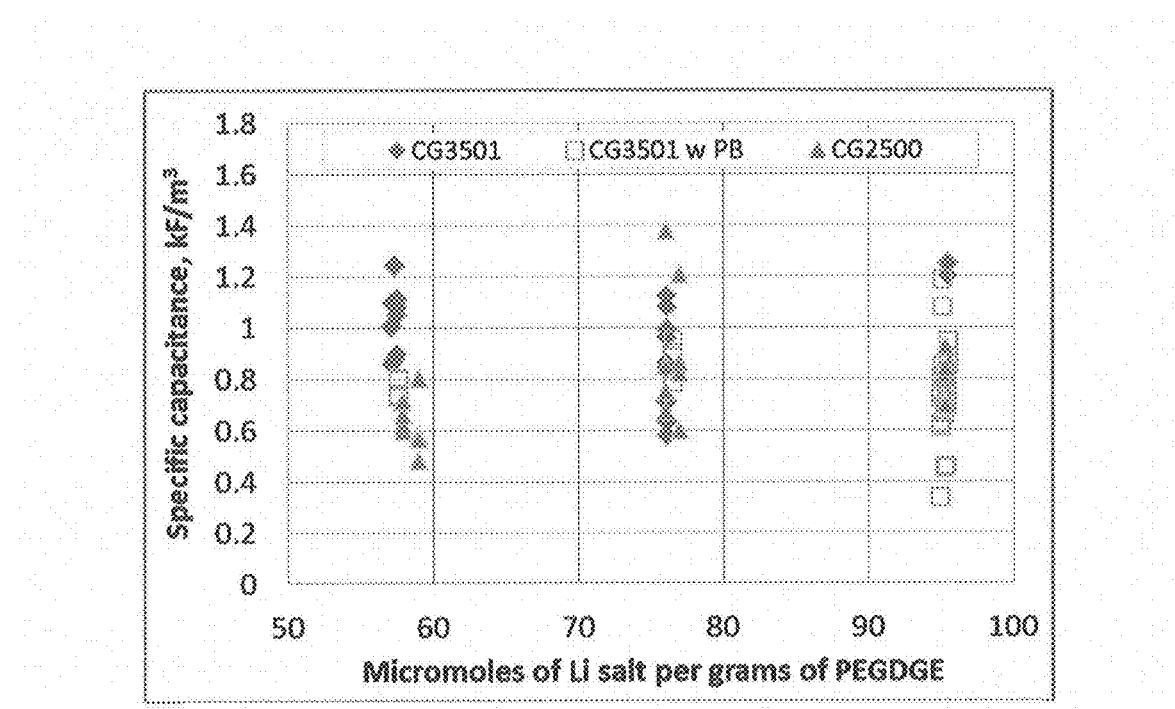
FIG. 8 shows the effect of Li salt concentration, solid polymer electrolyte (SPE) formulation, and type of polypropylene membrane separator on specific capacitance.
Figure 9:
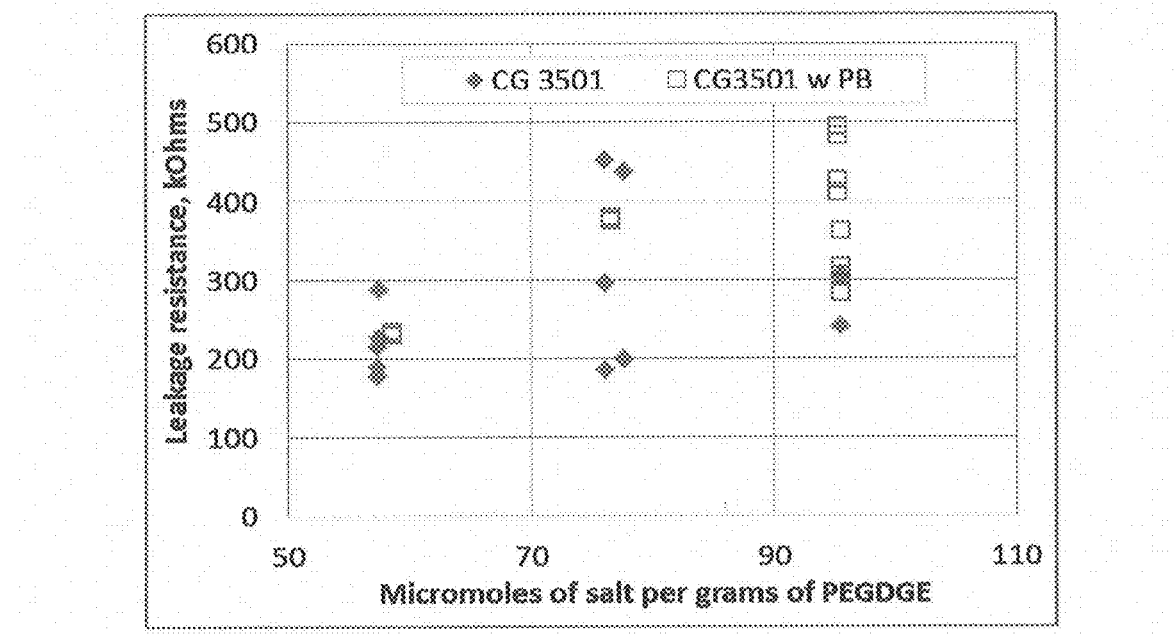
FIG. 9 shows the effect of Li salt concentration and SPE formulation on leakage resistance, for structural EDLCs made with a polypropylene membrane separator.

This outcome may suggest that the PB added to the regular SPE leads to a somewhat lower capacitance for the supercapacitors. However, from the leakage resistance plot in FIG. 7, it appears that the PB increases the leakage resistance, which is a desirable outcome. Data plotted in FIG. 8 suggests that the specific capacitance tends to increase with the amount of Li salt used in the SPE formulation when the separator material is Celgard 2500. Because of the observed failure modes associated with Celgard 2500, this separator material was not used in subsequent batches. Same data (FIG. 8) seems to indicate that when Celgard 3501 is used as separator material, the specific capacitance gets slightly lower with the increase in the amount of Li salt. This may only be due to the scatter in the data.

The Li salt content did not have a significant effect on the overall mechanical properties of the structural supercapacitor based on the results gathered during the tests performed for mechanical characterization. The results reported in Table 1 represent average values of the ultimate strength and modulus of elasticity as determined from tests performed on specimens coupons made with SPEs with different Li salt concentrations. In tension, the power storage composites have 69% of the standard composite stiffness and 58% of the standard composite strength. The addition of the PB does not have a significant effect (less than 2%) on the power storage composites tensile properties.

TABLE 1

Summary of the mechanical properties for the power storage composite and a regular composite material.

|  | Modulus of elasticity (GPa) | Ultimate tensile strength (MPa) | Flexural modulus of elasticity (GPa) | Flexural strength (MPa) |
| --- | --- | --- | --- | --- |
| Regular single layer composite | 27.4 | 794 | 32.1 | 280 |
| Power storage composite w/o PB | 18.9 | 466 | 18.1 | 93 |
| Power storage composite w/PB | 18.7 | 456 | 12.2 | 87 |

Figure 10:
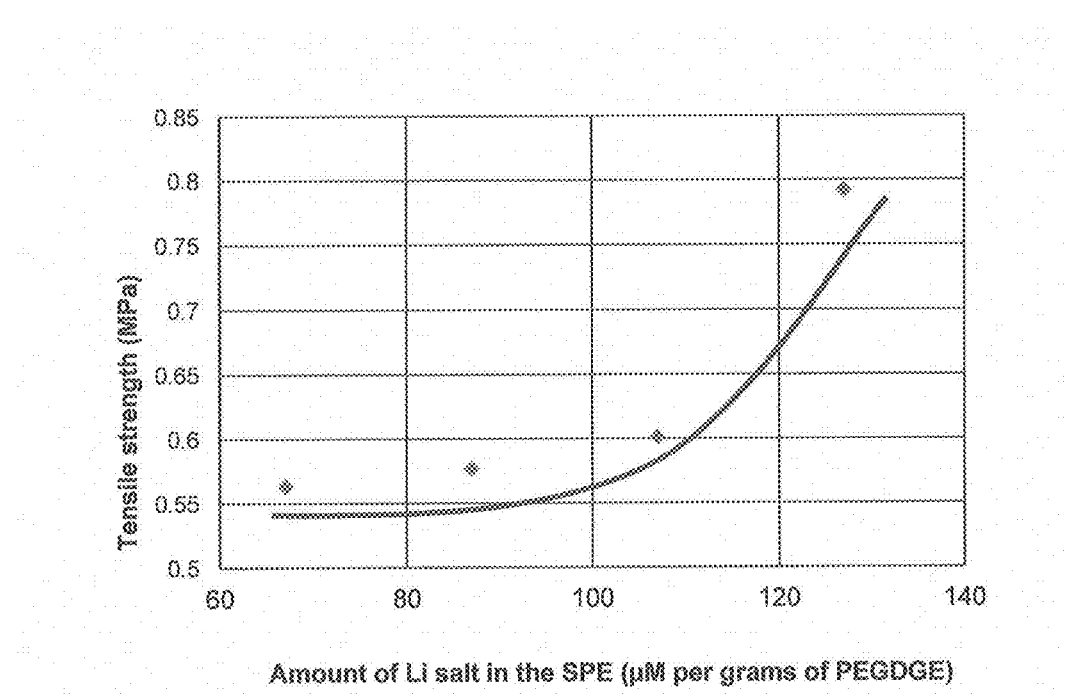
FIG. 10 shows the effect of Li salt concentration on the mechanical strength of the solid polymer electrolyte (SPE).

Preliminary measurements of the tensile strength of the SPE, as a function of the amount of Li salt, are reported in FIG. 10. The data seems to suggest that the increase in the amount of Li salt does not lead to a significant increase in the tensile strength of the SPE.

When considering the flexural properties of the standard and power storage composites without PB, the power storage composite has only 56% of the standard composite stiffness and 33% of the standard composite strength. The addition of PB to the SPE is detrimental to the flexural stiffness of the power storage composite, which is measured to be about 67% that of the composite w/o PB. However, the PB has very little effect on the material flexural strength.

The disclosures of all articles and references mentioned in this application, including patents, are incorporated herein by reference in their entirety.

It is understood that the examples and embodiments described herein are for illustrative purposes only. Unless clearly excluded by the context, all embodiments disclosed for one aspect of the invention can be combined with embodiments disclosed for other aspects of the invention, in any suitable combination. It will be apparent to those skilled in the art that various modifications and variations can be made to the present invention without departing from the scope of the invention. Thus, it is intended that the present invention covers the modifications and variations of this invention provided they come within the scope of the appended claims and their equivalents. All publications, patents, and patent applications cited herein are hereby incorporated herein by reference for all purposes.

We claim:

1. A method to form a capacitor, comprising:
providing a first electrode comprising a plurality of carbon fibers;
providing a second electrode comprising a plurality of carbon fibers;
disposing at least one cellular material between said first electrode and said second electrode;
impregnating at least one of the first electrode, the second electrode, and the cellular material at least partially with one or more liquid prepolymers comprising an electrolyte material; and
curing said one or more liquid prepolymers to form a polymeric matrix, thereby forming said capacitor comprising a three-layer laminate capacitor having a first electrode layer, a second electrode layer, and a cellular layer disposed between said first electrode and said second electrode.

2. The method of claim 1, further comprising:
initially forming a first two-layer laminate comprising said first electrode and a first cellular material;
disposing a separator layer on top of said first cellular material to form a three-layer laminate;
disposing a second two-layer laminate comprising a second electrode and a second cellular material with the second cellular material on top of said separator layer to form a five-layer laminate;
impregnating at least one of the first and second electrodes, first and second cellular materials, and the separator layer at least partially with said one or more liquid prepolymers; and
curing said one or more liquid prepolymers to form a polymeric matrix, thereby forming said capacitor comprising said five-layer laminate.

3. The method of claim 1, further comprising stacking (N) two-layer laminate comprising an electrode and a cellular material on top of a three-layer laminate capacitor to form a first composite capacitor, wherein (N) is greater than or equal to 2.

4. The method of claim 2, further comprising stacking (M) four-layer laminate comprising an electrode, a first cellular material, a separator layer, and a second cellular material on top of a five-layer laminate capacitor to form a second composite capacitor, wherein (M) is greater than or equal to 2.

5. The method of claim 2, further comprising:
stacking (N) two-layer laminate comprising an electrode and a cellular material on top of a three-layer laminate capacitor to form a [3+2×(N)]-layer laminate, wherein (N) is greater than or equal to 2; and
stacking (M) four-layer laminate comprising an electrode, a first cellular material, a separator layer, and a second cellular material on top of said [3+2×(N)]-layer laminate to form a third composite capacitor comprising a [3+2×(N)]-layer laminate in combination with a 4×(M)-layer laminate, wherein (M) is greater than or equal to 2.

6. The method of claim 2, further comprising:
stacking (M) four-layer laminate comprising an electrode, a first cellular material, a separator layer, and a second cellular material on top of a five-layer laminate capacitor to form a [5+4×(M)]-layer laminate, wherein (M) is greater than or equal to 2; and
stacking (N) two-layer laminate comprising an electrode and a cellular material on top of said [5+4×(M)]-layer laminate to form a fourth composite capacitor, wherein (N) is greater than or equal to 2.

7. The method of claim 2, further comprising interleaving (N) two-layer laminate comprising an electrode and a cellular material and (M) four-layer laminate comprising an electrode, a first cellular material, a separator layer, and a second cellular material together to form a fifth composite capacitor comprising (N) two-layer laminate interleaved with (M) four-layer laminate, wherein (N) is greater than or equal to 2 and (M) is greater than or equal to 2.

8. The method of claim 2, wherein impregnating step further comprising soaking at least one of the electrodes, the cellular material layers, and/or the separator layer with said one or more liquid prepolymers.

9. The method of claim 2, prior to said curing step, wherein said capacitor is compressed at a pressure having a range of about 0.5 MPa and about 4.5 MPa.

10. The method of claim 2, wherein said curing step further comprising heating said one or more liquid prepolymers at about 80° C. for about 2 hours.

11. A method to form a capacitor, comprising:
disposing at least one cellular material between a first electrode including a first plurality of carbon fibers and a second electrode including a second plurality of carbon fibers, further comprising:
  forming a first two-layer laminate comprising the first electrode and a first cellular material; and
  disposing a separator layer on top of the first cellular material to form a three-layer laminate;
impregnating at least one of the first electrode, the second electrode, and the cellular material at least partially with one or more liquid prepolymers comprising an electrolyte material; and
curing the one or more liquid prepolymers to form a polymeric matrix.

12. The method of claim 11, wherein disposing at least one cellular material between the first electrode and the second electrode further comprises:
  forming a second two-layer laminate comprising the second electrode and a second cellular material with the second cellular material on top of the separator layer to form a five-layer laminate.

13. The method of claim 12, further comprising
impregnating at least one of the first electrode and the second electrode, the first cellular material and the second cellular material, and the separator layer at least partially with the one or more liquid prepolymers; and
curing the one or more liquid prepolymers to form a polymeric matrix.

* * * * *